United States Patent
Younger

(10) Patent No.: US 7,346,535 B2
(45) Date of Patent: *Mar. 18, 2008

(54) METHOD AND SYSTEM FOR OPERATING A PERSONNEL WORKFLOW TOOL

(75) Inventor: John Younger, San Rafael, CA (US)

(73) Assignee: Accolo, Inc., San Rafael, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 11/385,490

(22) Filed: Mar. 20, 2006

(65) Prior Publication Data

US 2006/0167739 A1    Jul. 27, 2006

Related U.S. Application Data

(60) Continuation of application No. 10/941,145, filed on Sep. 14, 2004, now Pat. No. 7,027,998, which is a division of application No. 10/258,254, filed on Oct. 21, 2002, now abandoned.

(51) Int. Cl.
G06F 9/46 (2006.01)
(52) U.S. Cl. ......................................... 705/9
(58) Field of Classification Search .......... 705/1, 705/9, 11
See application file for complete search history.

(56) References Cited

U.S. PATENT DOCUMENTS

| | | | |
|---|---|---|---|
| 5,164,897 A | 11/1992 | Clark et al. |
| 5,592,375 A | 1/1997 | Salmon et al. |
| 5,978,768 A | 11/1999 | McGovern et al. |
| 6,058,389 A | 5/2000 | Chandra et al. |
| 6,208,984 B1 | 3/2001 | Rosenthal |
| 6,272,467 B1 | 8/2001 | Durand et al. |
| 6,289,340 B1 | 9/2001 | Puram et al. |
| 6,311,164 B1 | 10/2001 | Ogden |
| 6,370,510 B1 | 4/2002 | McGovern et al. |
| 6,381,592 B1 | 4/2002 | Reuning |
| 6,385,620 B1 | 5/2002 | Kurzius et al. |
| 6,457,005 B1 | 9/2002 | Torrey |
| 6,618,734 B1 | 9/2003 | Williams et al. |
| 6,662,194 B1 | 12/2003 | Joao |
| 6,873,964 B1 | 3/2005 | Williams et al. |

(Continued)

FOREIGN PATENT DOCUMENTS

WO    WO 9917242    4/1999

(Continued)

OTHER PUBLICATIONS

Dialog "Career Rewards Partners with Local Merchants to Reach", Aug. 2000. Business wire, Dialog file 20, Accession No. 10381700.*

(Continued)

*Primary Examiner*—Romain Jeanty
(74) *Attorney, Agent, or Firm*—Michael A. Glenn; Glenn Patent Group

(57) ABSTRACT

The invention includes three primary methodical tools. The first tool implements a job recruiting toolkit. The second tool implements a method of generating referrals based upon a virtual community of people who relate to the job description. The third tool implements an enterprise recruitment toolkit.

30 Claims, 16 Drawing Sheets

U.S. PATENT DOCUMENTS 6,904,407 B2 6/2005 Ritzel
2002/0147625 A1 10/2002 Kolke

FOREIGN PATENT DOCUMENTS

WO    WO 0022548    4/2000
WO    WO 01004811   1/2001

OTHER PUBLICATIONS

Dialog—"ERP Vendor Lawson Buys Web-Based Recruitment Firm", Mar. 1, 1999, Computergram International, n3611.

Brown et al, "Skillful Inventory", Aug. 1999, Bank Marketing, v31n8 pp. 16-24. Dialog file 15 Accession No. 01903023.

Dialog—"Career Rewards Partners with Local Merchants to Reach", Aug. 2000, Business Wire, Dialog file 20, Accession No. 10381700.

Proquest "Recruitsoft.com Announces Van Ella Alliance for Online Candidate Background Checks", Sep. 2000, Business Edition, Business Wire, New York, Sep. 7, 2000, p. 1.

Donnelly, "Networking and the Net", Aug. 1999, The Magazine for Senior Financial Executives, v15, n8, p. 93.

"New Web Site Pays Job Seekers to Help Fill High Tech Job Openings", Nov. 1999, Business/Technology Edition, Business Wire, New York, Nov. 22, 1999, p. 1.

\* cited by examiner

METHOD AND SYSTEM FOR OPERATING A PERSONNEL WORKFLOW TOOL

CROSS-REFERENCE TO RELATED APPLICATIONS

This application is a continuation of U.S. patent application Ser. No. 10/941,145 filed Sep. 14, 2004 now U.S. Pat. No. 7,027,998 which is a divisional of U.S. patent application Ser. No. 10/258,254 filed Oct. 21, 2002 now abandoned, and is related to U.S. patent application Ser. No. 10/941,499 filed on Sep. 14, 2004 entitled "Method And System For Generating Referrals For Job Positions Based Upon Virtual Communities Comprised Of Members Relevant To The Job Positions", and filed concurrently herewith. This application claims priority from International Patent Application No. PCT/US01/12849, filed Apr. 19, 2001, which is incorporated by reference herein.

TECHNICAL FIELD

This invention relates to the generation of referrals and the use of those referrals in an integrated referral and recruitment system covering from definition of a position, recruiting, interviewing, candidate selection, candidate negotiation, assimilation of new hires, and facilitation of subsequent mentoring relationships.

BACKGROUND ART

Every growing company has a common problem: finding good people fast enough to meet critical business objectives. Existing options for finding and managing candidates are highly fragmented and time consuming to manage, often including web postings, advertisements, employee referrals, engaging recruiters, and searching resume bulletin boards.

The market for recruiting services in the United States and elsewhere is rapidly growing, and according to industry sources, businesses in the United States spent over $13 Billion (US) to hire new employees in 1997. As Internet usage becomes ever more widespread, companies from a broad range of industries are expected to do at least part of their employee recruitment over the Internet. There are forecasts that, by 2003, most large companies, 60% of the medium companies and 20% of the small companies in the United States will use the Internet for recruitment purposes. In 1998 alone, there were over 28 Million job postings on the World Wide Web.

Most companies face another set of challenges having to do with managing the hiring process. While a variety of tools and services for portions of the hiring process exist, there is no single tool which spans the tasks of defining a position, recruiting, interviewing, candidate selection, candidate negotiation, and assimilation of new hires.

A central problem with existing approaches is the difficulty communicating what the actual status of the hiring is and what are the next steps of the hiring strategy. "I interviewed him or her, now what do I do?" "I interviewed for 6 hours and I never heard anything from anyone afterwards?" "I opened new job request with the Human Resources Department. It has been over three weeks, and I haven't heard from anyone. What is going on?" Note the problem doesn't change when recruitment is out-sourced, in fact in many circumstances, communications becomes more difficult and/or erratic.

An associated communication problem is the inability for changes in hiring strategies to be communicated to everyone affected. There are many reasons why a hiring position may be either frozen or cancelled, but seldom do the people involved in the hiring activity find out about them in a time-efficient manner. As a consequence, job interviews occur for positions that no longer exist, people are brought long distances for no realistic objective, and they don't find out about it till much later, if ever.

Another problem that pervades this sea of partial solutions is the basic financial management questions, which become so difficult to answer. How much did it actually cost to hire for a given position? How much did the corporate entity lose in delays for hiring that position? How long did it take to fill the position versus when the position was to be filled? Each of these questions is difficult to answer and/or questionable in its accuracy of answer today.

Sitting on top of these problems is a fundamental difficulty in managing a recruitment process where there is no established, reliable way to review whether a corporate entity's hiring strategy was accurately implemented, realistically adjusted based upon interim results, and met its corporate objectives.

Today, there is no realistic mechanism supporting the adjustment of a hiring strategy based upon interim results. The options are usually not thought out and reviewed, so management decisions are made in a vacuum. They "just happen" leading to erratic results whose only certainty is they have cost money, take time and take resources. The interim results are difficult to coherently collect and review with relevant decision-makers. The consequence of this is more sporadic activity and misdirection, often feeding on itself. Usually costing far more than is reasonable.

There are common problems experienced with existing tools when someone newly hired arrive at the job site for the first day of work. They may discover that at least one crucial piece of their work situation is missing. Examples of such missing pieces include, but are not limited to, a working telephone, phone mail account, a computer interfaced to the relevant networks, desk, chair, employment contract, non-disclosure agreement, provision for business cards, and corporate security IDs.

There are additional problems with existing personnel tools related to the discontinuity between the various pieces, having to do with the ability to confirm the reality of recruiting management estimates. Many managers will either assume that the job market is the same as it was the last time they hired in a given field, or will choose to paint an unrealistic picture about the effort and expense of filling a given position without even checking. The consequent cost of these managerial mistakes is huge. What is needed is a mechanism providing rapid and accurate feedback to a corporate entity's personnel department or executive group on just what it takes to fill one or more positions.

A number of companies have put in place referral mechanisms to identify candidates for job positions either in their organizations or in their clients' organizations. While these efforts were definitely pioneering in their intent, there are several persistent problems with existing referral mechanisms.

Tracking referrals has tended to be sporadic, leading to cases of an individual referring highly qualified people whose information never gets to the correct hiring authorities, or someone is hired based upon a referral and appropriate recognition is not made to the referring source.

Any single person's network of acquaintances is limited and existing referral networks are essentially a collection of address books for a handful of people, often limited to some corporate employees, their friends and family, and seldom anything else. People who in fact, may not even know about a job position's requirements nor the communities of people conversant in those requirements. For example, there could be a person within two blocks of the hiring agent, who either is the right candidate or knows the right candidate, but there is no mechanism by which the hiring agent can find that person who is so close by existing referral mechanisms.

While all of the discussion so far has focused on the corporate perspective, most of these problems have significant negative consequences for individuals looking for positions. Probably the most annoying problem is the lack of coherent communication. Estimates are that 90% of the people applying for positions on the Internet never get any response to their application.

It is important to understand that most people do not look for another job unless there is a very large reason. They may be unemployed, facing lay-off, or the possibility of lay-off, and/or they may be extremely unhappy or frustrated with their current position. The background of stress, worry, frustration and outright fear can be enormous. So the lack of communication mentioned above has far greater consequences than it would under ordinary circumstances.

Today, an individual is severely limited in their ability to find potential positions relevant to their requirements. They may rely on their circle of friends, family and professional associates, but they face the same problem as the referral service. Most of these people will not or can not understand the job requirements or know the people or companies needing such requirements.

An individual accessing the World Wide Web will find thousands of job web sites and a level of depersonalization that would be daunting to anyone under the best of circumstances, and is often devastating to people, who, for whatever reason, are looking for a job.

SUMMARY OF THE INVENTION

The invention includes three primary methodical tools. The first tool implements a job recruiting toolkit. The second tool implements a method of generating referrals based upon a virtual community of people who relate to the job description. The third tool is an enterprise class recruitment toolkit. Each of these methodical tools addresses at least part of the problems found in today's recruitment process.

The three tools form an integrated recruitment management and communication tool platform. The job recruitment tool can generate a referral request sent to the referral generation tool. The enterprise recruitment toolkit can incorporate the job recruiting toolkit to oversee and facilitate the job hiring process. Taken collectively, these tools solve at least the problems previously discussed herein.

DETAILED DESCRIPTION OF THE INVENTION

Figure 1A:
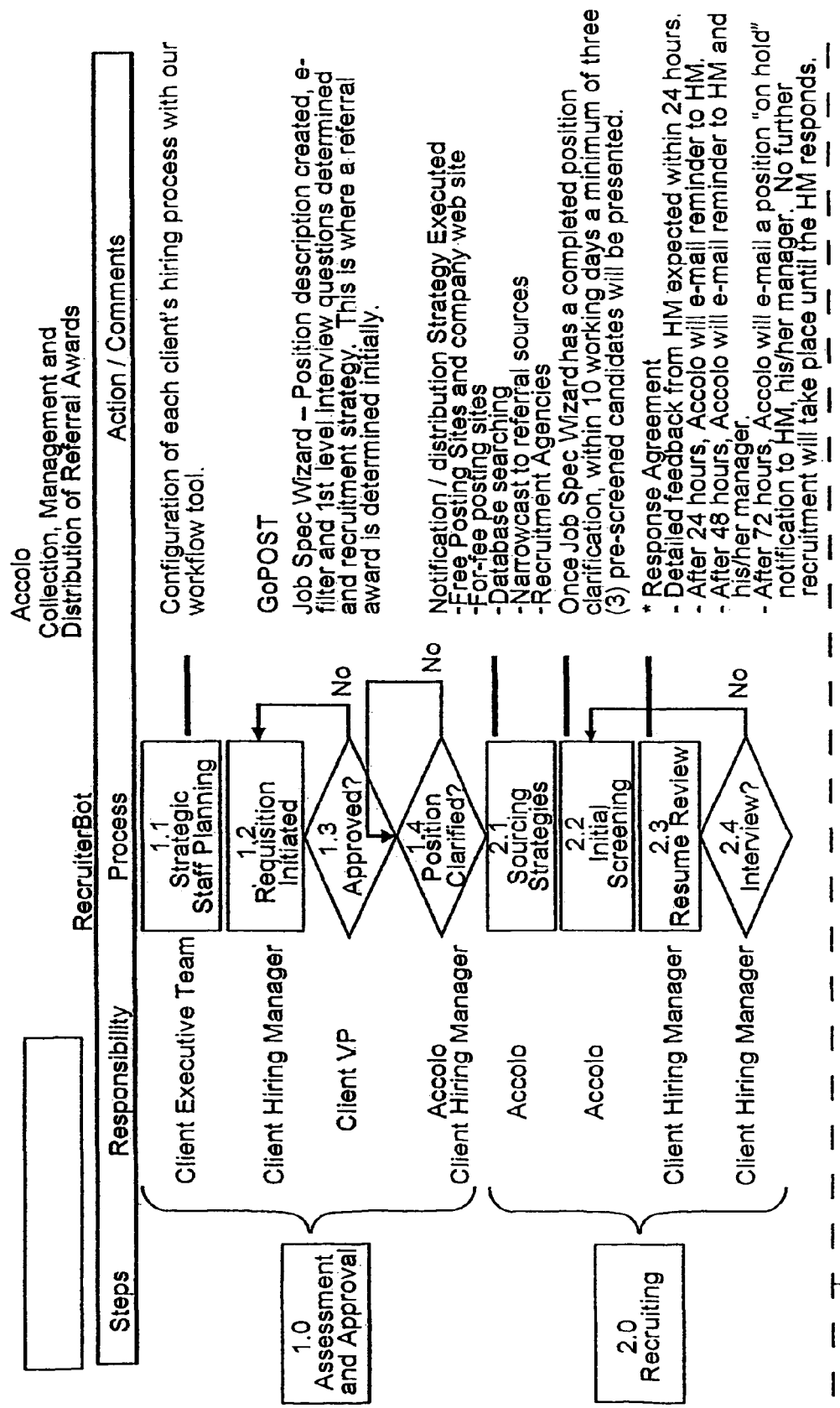
FIG. 1 depicts a process flow view of one preferred embodiment of the invention.
Figure 1B:
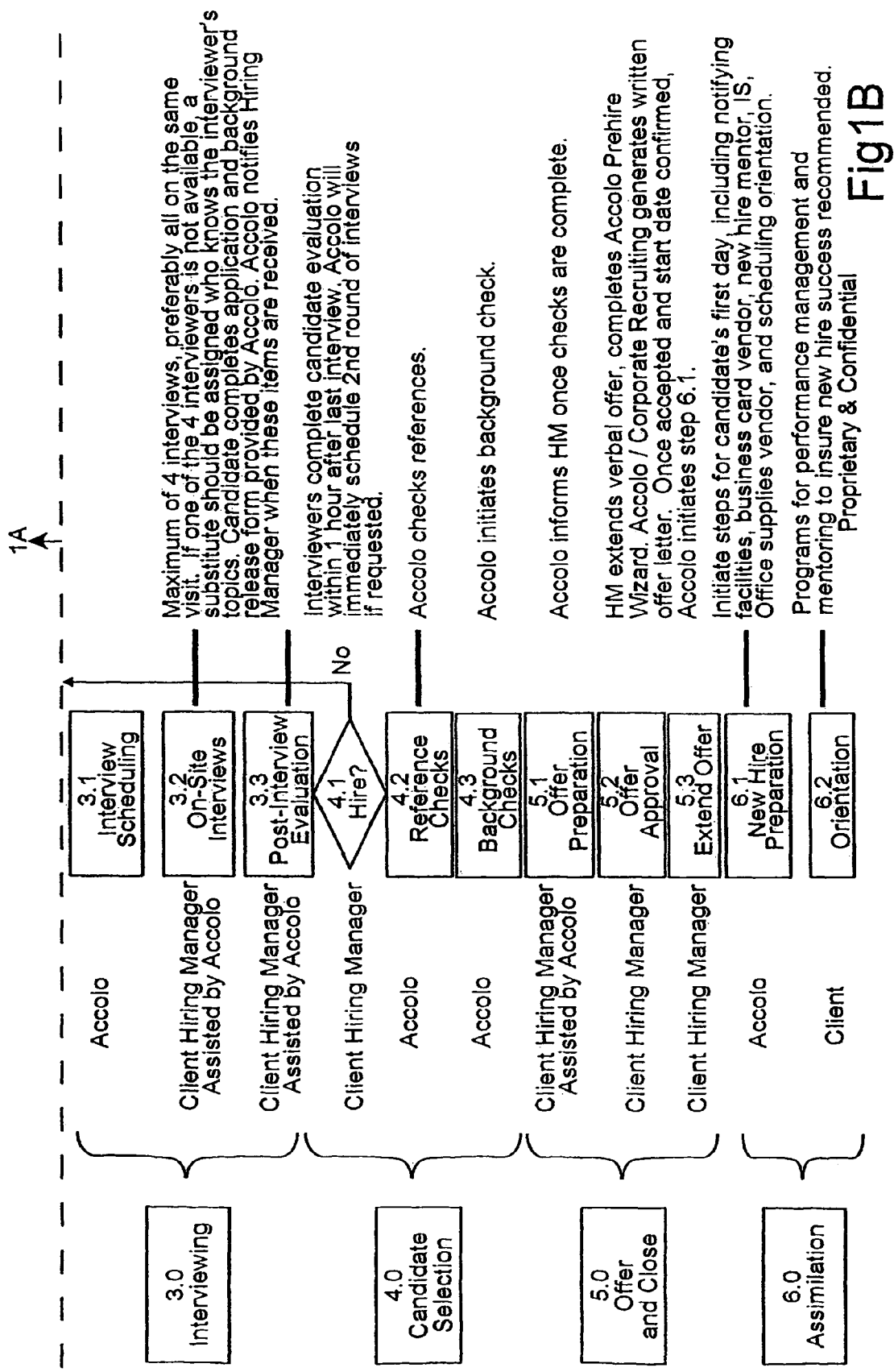

FIG. 1 depicts a process flow view of one preferred embodiment of the invention.

Figure 2:
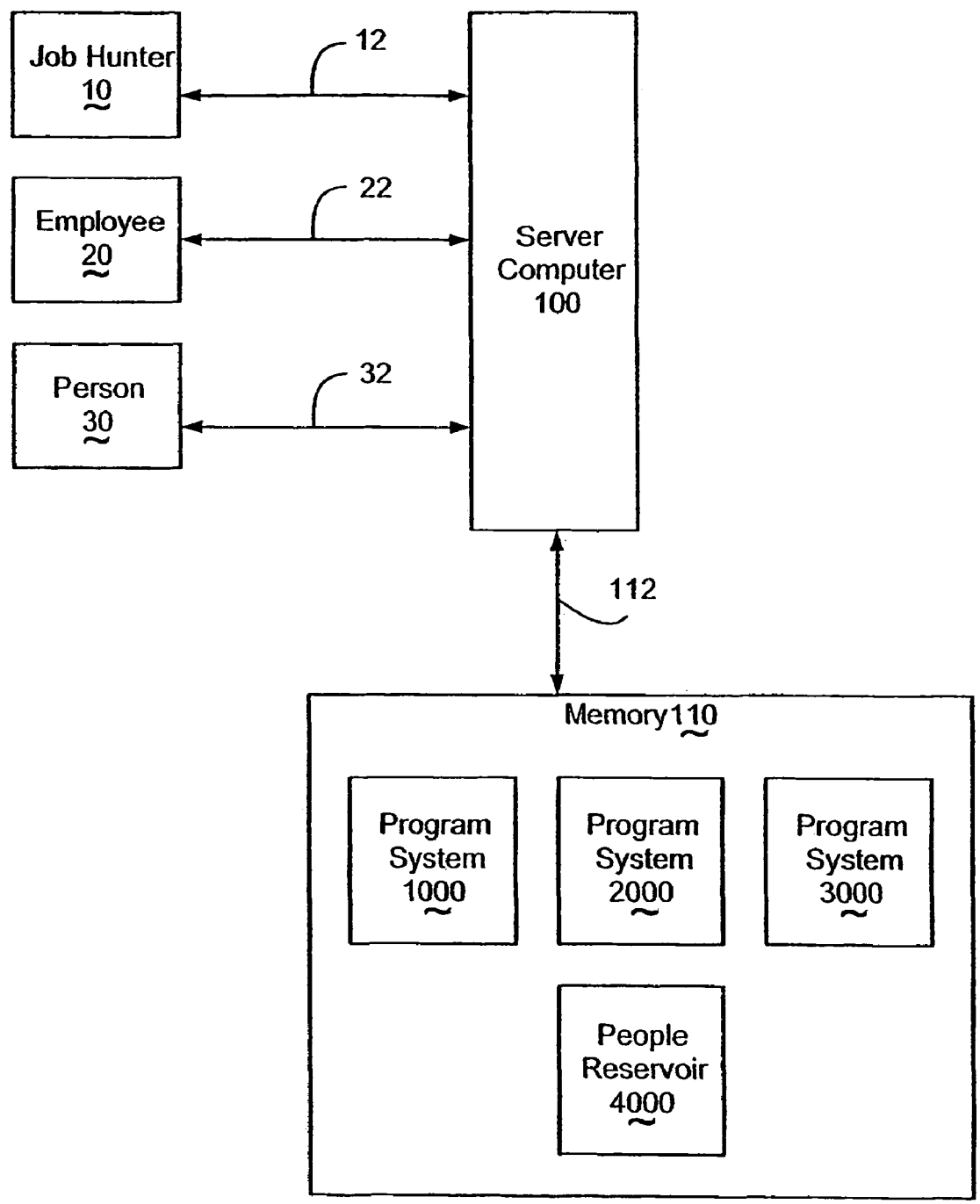
FIG. 2 depicts a system comprising a server communicatively coupled with at least one employee 20 of a corporate entity and communicatively coupled to at least one job hunter 10 operated by at least one program system 1000, 2000 and/or 3000 implementing one of the methods of the invention.

FIG. 2 depicts a system comprising a server computer 100 communicatively coupled 22 with at least one employee 20 of a corporate entity and communicatively coupled 12 to at least one job hunter 10 and operated by at least one program system 1000, 2000 and/or 3000 implementing one of the methods of the invention.

These program systems are comprised of program steps residing in memory 110 accessibly coupled 112 to server computer 100.

Program system 1000 implements a method of operating a job position recruiting tool accessed by the employee 20 of a corporate entity and by the job hunter 10.

Program system 2000 implements a method generating referrals for at least is one job positions based upon at least one virtual community comprised of at least one member of the virtual community relevant to the job positions based upon a people reservoir 4000.

Program system 3000 implements a method of operating a personnel workflow tool accessed by the employee 20 and accessed by the job hunter 10.

Figure 3:
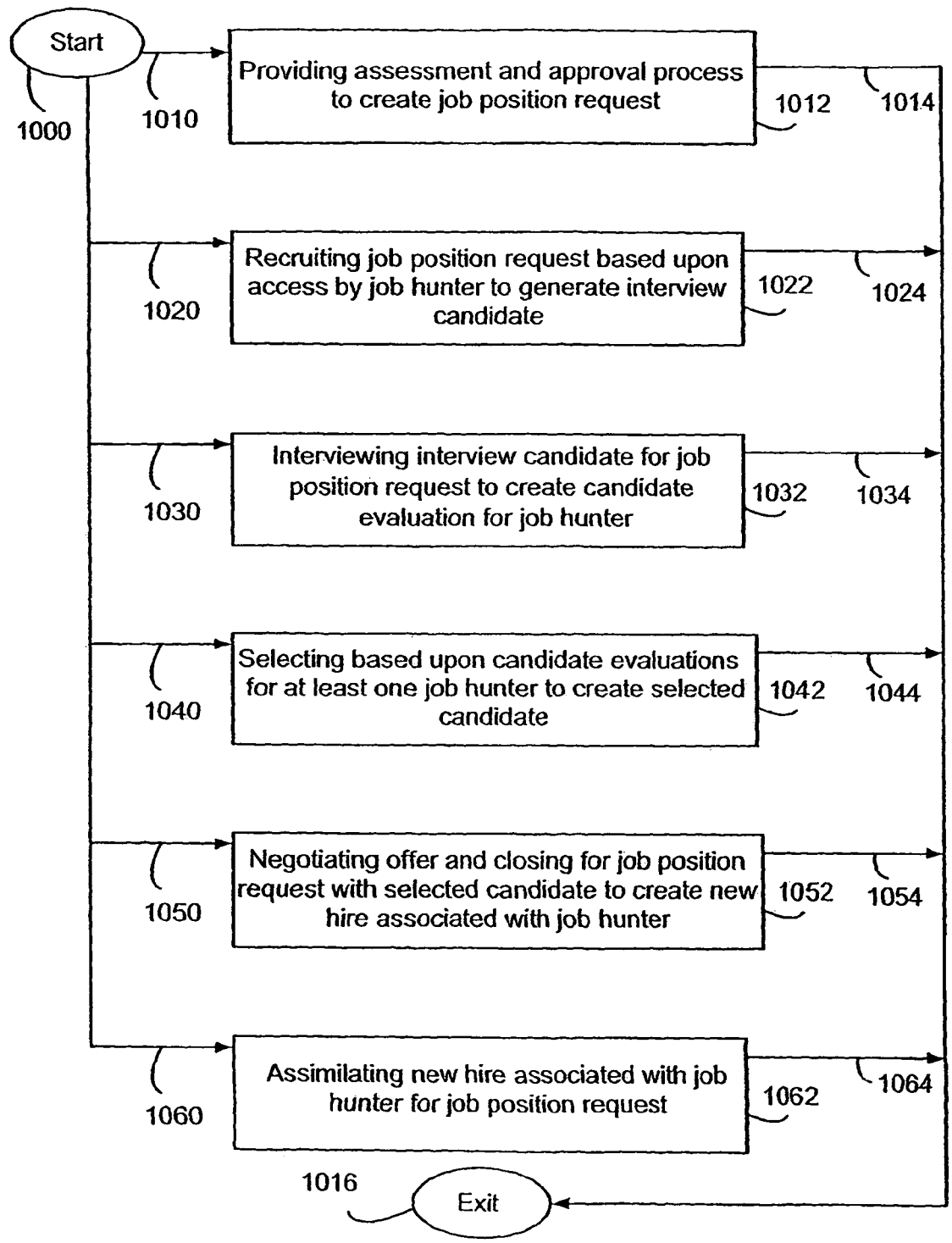
FIG. 3 depicts a detail flowchart of program system 1000 of FIG. 2 implementing a method of operating a job position recruiting tool accessed by at least one employee of a corporate entity and accessed by at least one job hunter.

FIG. 3 depicts a detail flowchart of program system 1000 of FIG. 2 implementing a method of operating a job position recruiting tool accessed by at least one employee of a corporate entity and accessed by at least one job hunter.

Arrow 1010 directs the flow of execution from starting operation 1000 to operation 1012. Operation 1012 performs providing an assessment and approval process to create a job position request. Arrow 1014 directs execution from operation 1012 to operation 1016. Operation 1016 terminates the operations of this flowchart.

Arrow 1020 directs the flow of execution from starting operation 1000 to operation 1022. Operation 1022 performs recruiting the job position request based upon access by the job hunter to generate an interview candidate. Arrow 1024 directs execution from operation 1022 to operation 1016. Operation 1016 terminates the operations of this flowchart.

Arrow 1030 directs the flow of execution from starting operation 1000 to operation 1032. Operation 1032 performs interviewing the interview candidate for the job position request to create a candidate evaluation for the job hunter. Arrow 1034 directs execution from operation 1032 to operation 1016. Operation 1016 terminates the operations of this flowchart.

Arrow 1040 directs the flow of execution from starting operation 1000 to operation 1042. Operation 1042 performs selecting based upon the candidate evaluations for at least one of the job hunters to create a selected candidate. Arrow 1044 directs execution from operation 1042 to operation 1016. Operation 1016 terminates the operations of this flowchart.

Arrow 1050 directs the flow of execution from starting operation 1000 to operation 1052. Operation 1052 performs negotiating offer and closing for the job position request with the selected candidate to create a new hire associated with the job hunter. Arrow 1054 directs execution from operation 1052 to operation 1016. Operation 1016 terminates the operations of this flowchart.

Arrow 1060 directs the flow of execution from starting operation 1000 to operation 1062. Operation 1062 performs assimilating the new hire associated with the job hunter for the job position request. Arrow 1064 directs execution from operation 1062 to operation 1016. Operation 1016 terminates the operations of this flowchart.

Figure 4:
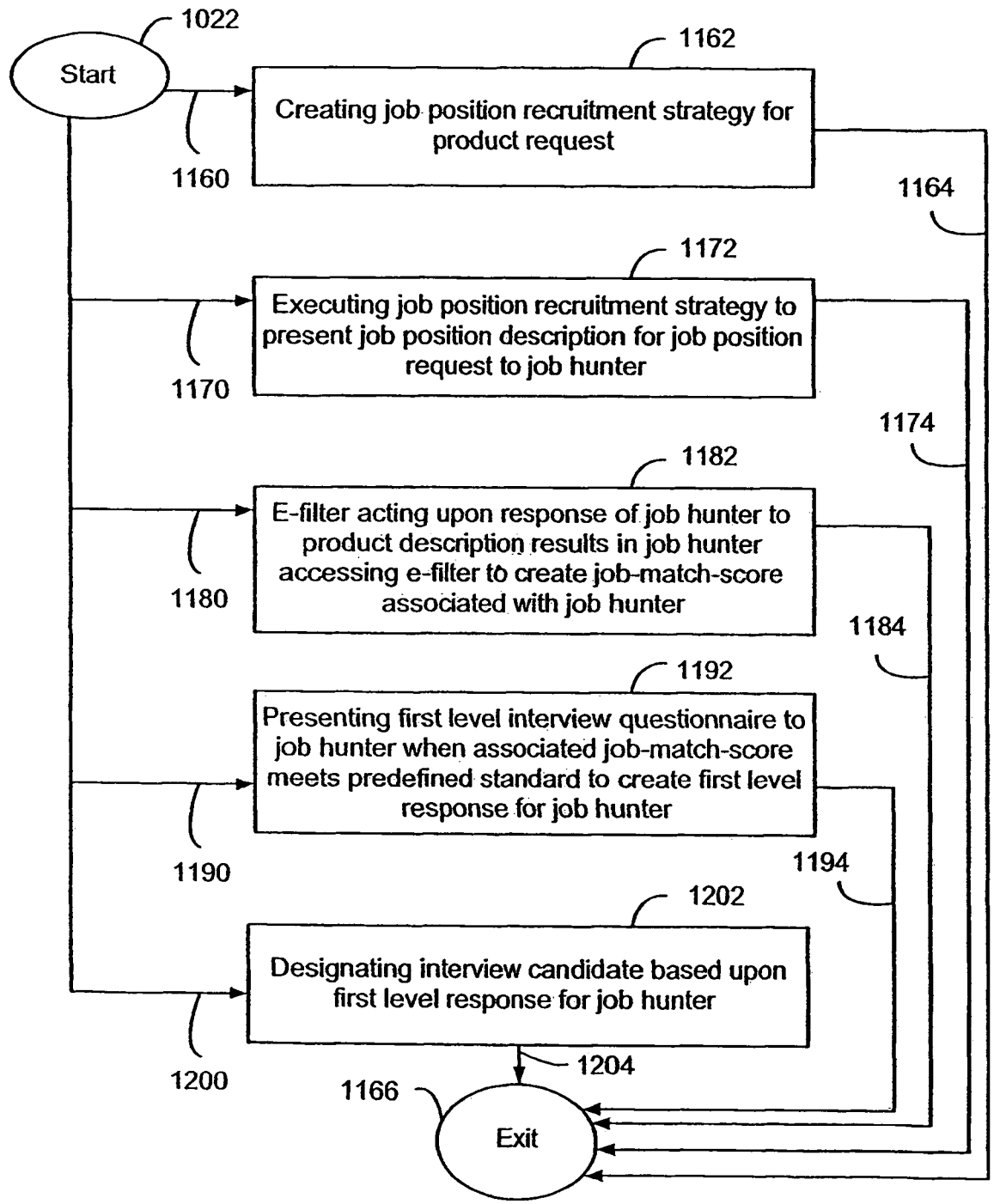
FIG. 4 depicts a detail flowchart of operation 1022 of FIG. 3 further recruiting the job position request based upon access by the job hunter.

FIG. 4 depicts a detail flowchart of operation 1022 of FIG. 3 further recruiting the job position request based upon access by the job hunter.

Arrow 1160 directs the flow of execution from starting operation 1022 to operation 1162. Operation 1162 performs creating a job position recruitment strategy for the product request. Arrow 1164 directs execution from operation 1162 to operation 1166. Operation 1166 terminates the operations of this flowchart.

Arrow 1170 directs the flow of execution from starting operation 1022 to operation 1172. Operation 1172 performs executing the job position recruitment strategy to present a job position description for the job position request to the job hunter. Arrow 1174 directs execution from operation 1172 to operation 1166. Operation 1166 terminates the operations of this flowchart.

Arrow 1180 directs the flow of execution from starting operation 1022 to operation 1182. Operation 1182 performs an e-filter acting upon the response of the job hunter to the product description results in the job hunter accessing the e-filter to create a job-match-score associated with the job hunter. Arrow 1184 directs execution from operation 1182 to operation 1166. Operation 1166 terminates the operations of this flowchart.

Arrow 1190 directs the flow of execution from starting operation 1022 to operation 1192. Operation 1192 performs presenting a first level interview questionnaire to the job hunter when the associated job-match-score meets a predefined standard to create a first level response for the job hunter. Arrow 1194 directs execution from operation 1192 to operation 1166. Operation 1166 terminates the operations of this flowchart.

Arrow 1200 directs the flow of execution from starting operation 1022 to operation 1202. Operation 1202 performs designating an interview candidate based upon the first level response for the job hunter. Arrow 1204 directs execution from operation 1202 to operation 1166. Operation 1166 terminates the operations of this flowchart.

Figure 5A:
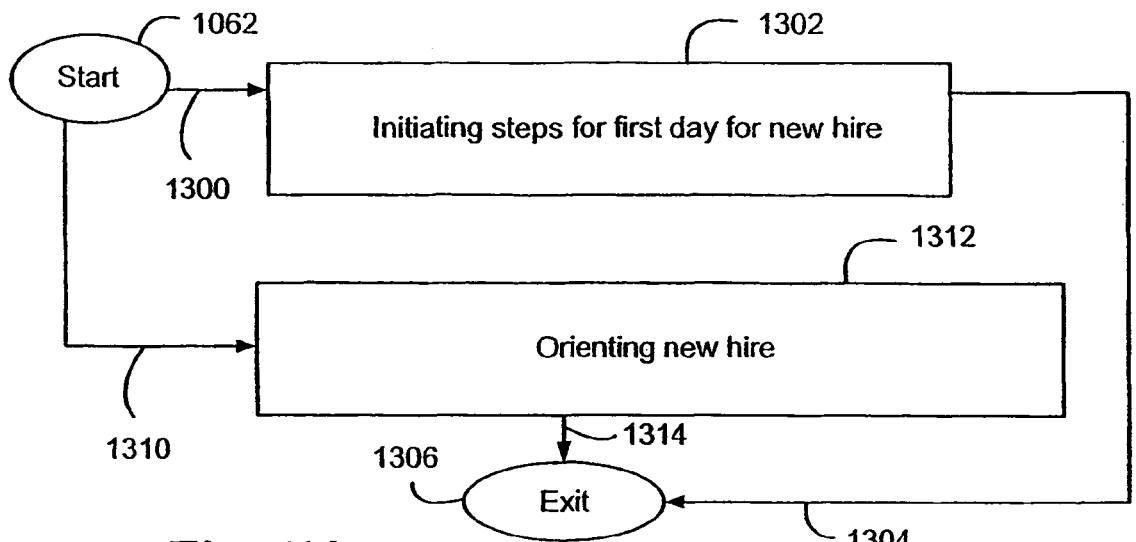
FIG. 5A depicts a detail flowchart of operation 1062 of FIG. 3 further to assimilating the new hire.

FIG. 5A depicts a detail flowchart of operation 1062 of FIG. 3 further assimilating the new hire.

Arrow 1300 directs the flow of execution from starting operation 1062 to operation 1302. Operation 1302 performs initiating steps for a first day for the new hire. Arrow 1304 directs execution from operation 1302 to operation 1306. Operation 1306 terminates the operations of this flowchart.

Arrow 1310 directs the flow of execution from starting operation 1062 to operation 1312. Operation 1312 performs orienting the new hire. Arrow 1314 directs execution from operation 1312 to operation 1306. Operation 1306 terminates the operations of this flowchart.

Figure 5B:
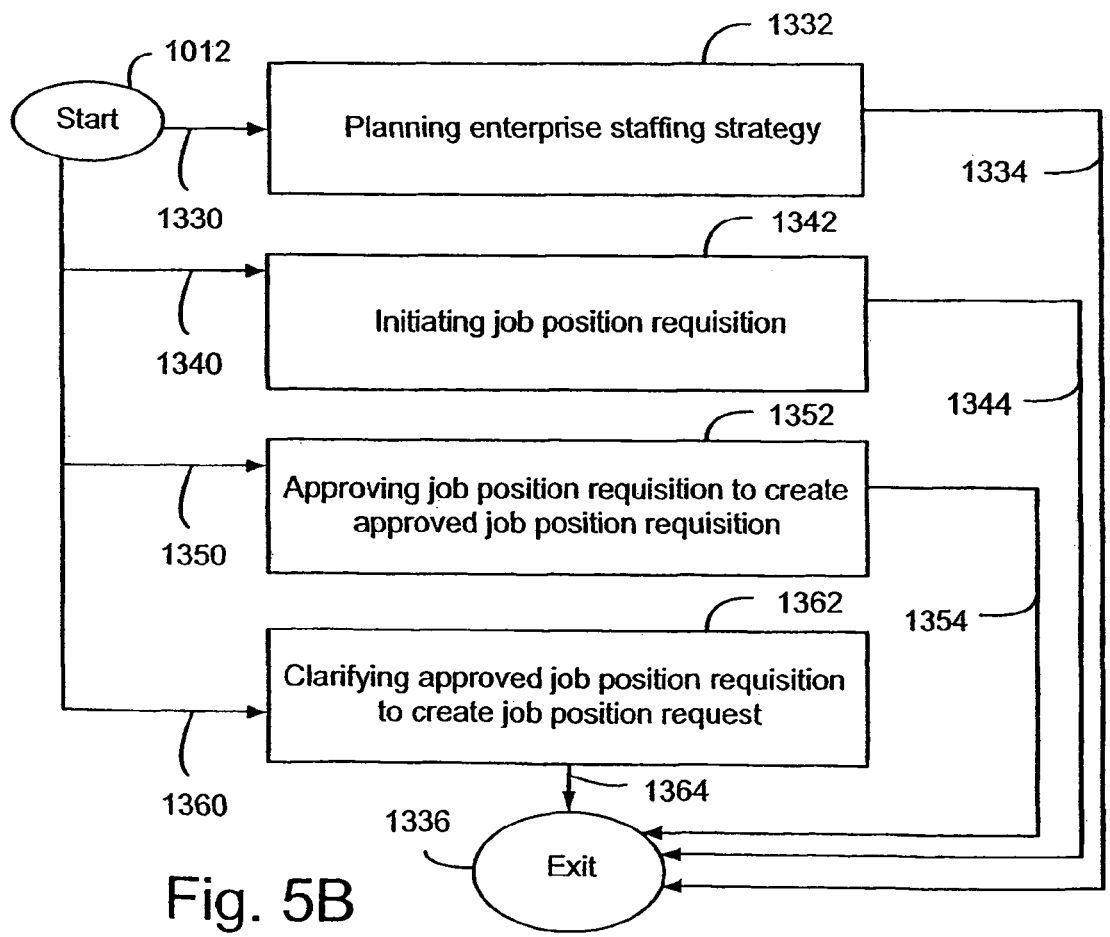
FIG. 5B depicts a detail flowchart of operation 1012 of FIG. 3 further providing the assessment and approval process to create the job position request.

FIG. 5B depicts a detail flowchart of operation 1012 of FIG. 3 further providing the assessment and approval process to create the job position request.

Arrow 1330 directs the flow of execution from starting operation 1012 to operation 1332. Operation 1332 performs planning an enterprise staffing strategy. Arrow 1334 directs execution from operation 1332 to operation 1336. Operation 1336 terminates the operations of this flowchart.

Arrow 1340 directs the flow of execution from starting operation 1012 to operation 1342. Operation 1342 performs initiating a job position requisition. Arrow 1344 directs execution from operation 1342 to operation 1336. Operation 1336 terminates the operations of this flowchart.

Arrow 1350 directs the flow of execution from starting operation 1012 to operation 1352. Operation 1352 performs approving the job position requisition to create an approved job position requisition. Arrow 1354 directs execution from operation 1352 to operation 1336. Operation 1336 terminates the operations of this flowchart.

Arrow 1360 directs the flow of execution from starting operation 1012 to operation 1362. Operation 1362 performs clarifying the approved job position requisition to create the job position request. Arrow 1364 directs execution from operation 1362 to operation 1336. Operation 1336 terminates the operations of this flowchart.

Figure 6A:
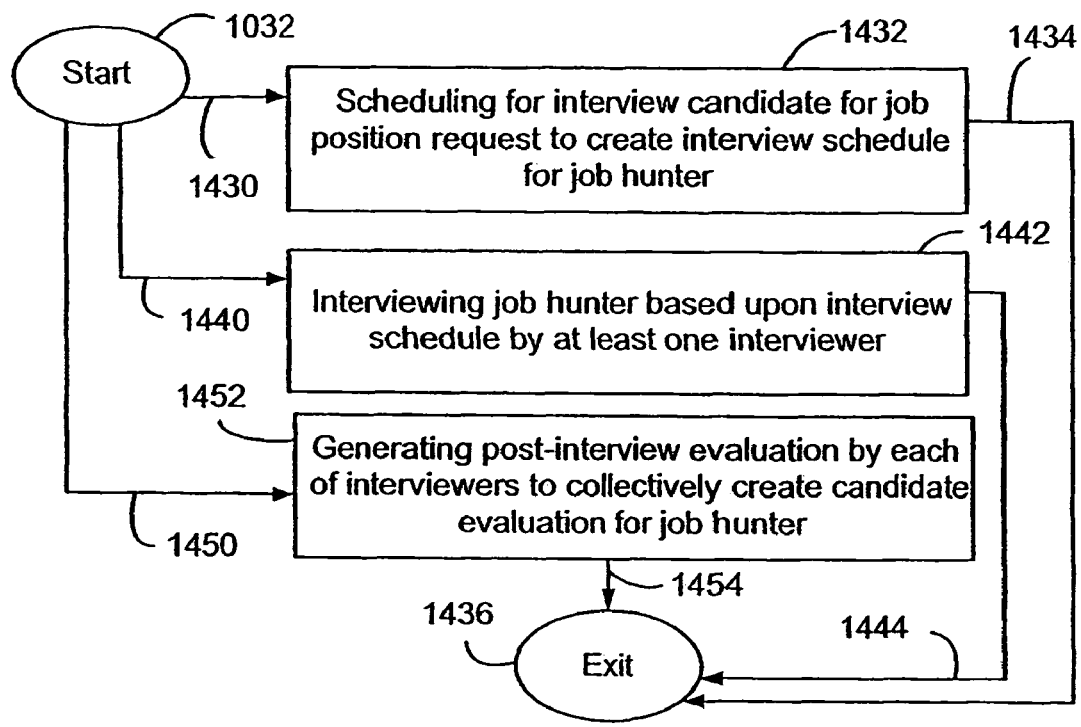
FIG. 6A depicts a detail flowchart of operation 1032 of FIG. 3 further interviewing the interview candidate for the job position request.

FIG. 6A depicts a detail flowchart of operation 1032 of FIG. 3 further interviewing the interview candidate for the job position request.

Arrow 1430 directs the flow of execution from starting operation 1032 to operation 1432. Operation 1432 performs scheduling for the interview candidate for the job position request to create an interview schedule for the job hunter. Arrow 1434 directs execution from operation 1432 to operation 1436. Operation 1436 terminates the operations of this flowchart.

Arrow 1440 directs the flow of execution from starting operation 1032 to operation 1442. Operation 1442 performs interviewing the job hunter based upon the interview schedule by at least one interviewer. Arrow 1444 directs execution from operation 1442 to operation 1436. Operation 1436 terminates the operations of this flowchart.

Arrow 1450 directs the flow of execution from starting operation 1032 to operation 1452. Operation 1452 performs generating a post-interview evaluation by each of the interviewers to collectively create the candidate evaluation for the job hunter. Arrow 1454 directs execution from operation 1452 to operation 1436. Operation 1436 terminates the operations of this flowchart.

Figure 6B:
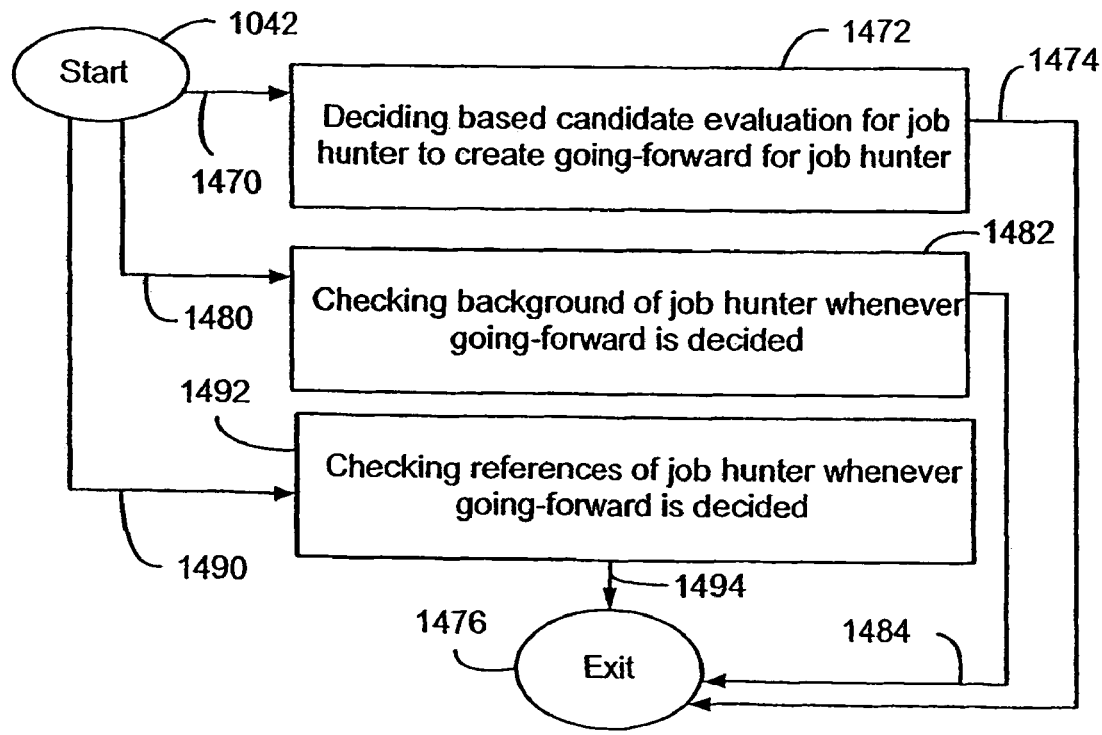
FIG. 6B depicts a detail flowchart of operation 1042 of FIG. 3 further selecting based upon the candidate evaluations for the job hunters to create the selected candidate.

FIG. 6B depicts a detail flowchart of operation 1042 of FIG. 3 further selecting based upon the candidate evaluations for the job hunters to create the selected candidate.

Arrow 1470 directs the flow of execution from starting operation 1042 to operation 1472. Operation 1472 performs deciding based the candidate evaluation for the job hunter to create going-forward for the job hunter. Arrow 1474 directs execution from operation 1472 to operation 1476. Operation 1476 terminates the operations of this flowchart.

Arrow 1480 directs the flow of execution from starting operation 1042 to operation 1482. Operation 1482 performs checking background of the job hunter whenever going-forward is decided. Arrow 1484 directs execution from operation 1482 to operation 1476. Operation 1476 terminates the operations of this flowchart.

Arrow 1490 directs the flow of execution from starting operation 1042 to operation 1492. Operation 1492 performs checking references of the job hunter whenever going-forward is decided. Arrow 1494 directs execution from operation 1492 to operation 1476. Operation 1476 terminates the operations of this flowchart.

Figure 7:
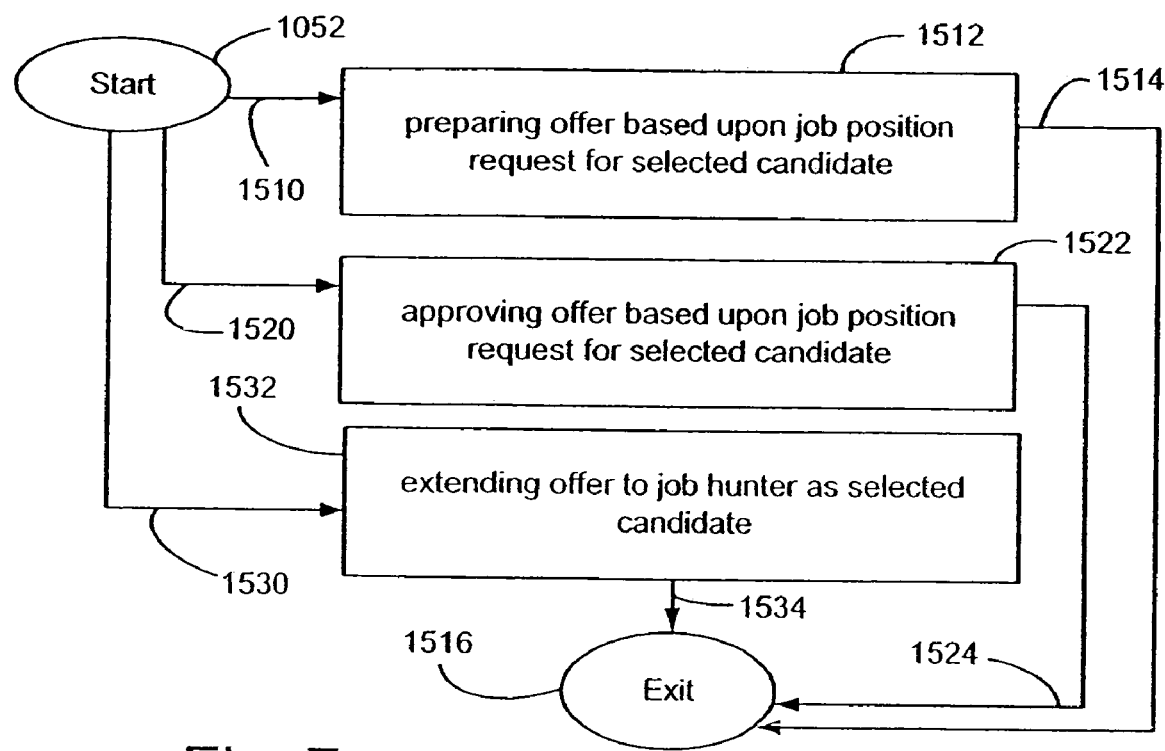
FIG. 7 depicts a detail flowchart of operation 1052 of FIG. 7 further negotiating offer and closing for the job position request with the selected candidate.

FIG. 7 depicts a detail flowchart of operation 1052 of FIG. 7 further negotiating offer and closing for the job position request with the selected candidate.

Arrow 1510 directs the flow of execution from starting operation 1052 to operation 1512. Operation 1512 performs preparing an offer based upon the job position request for the selected candidate. Arrow 1514 directs execution from operation 1512 to operation 1516. Operation 1516 terminates the operations of this flowchart.

Arrow 1520 directs the flow of execution from starting operation 1052 to operation 1522. Operation 1522 performs approving the offer based upon the job position request for the selected candidate. Arrow 1524 directs execution from operation 1522 to operation 1516. Operation 1516 terminates the operations of this flowchart.

Arrow 1530 directs the flow of execution from starting operation 1052 to operation 1532. Operation 1532 performs extending the offer to the job hunter as the selected candidate. Arrow 1534 directs execution from operation 1532 to operation 1516. Operation 1516 terminates the operations of this flowchart.

Figure 8:
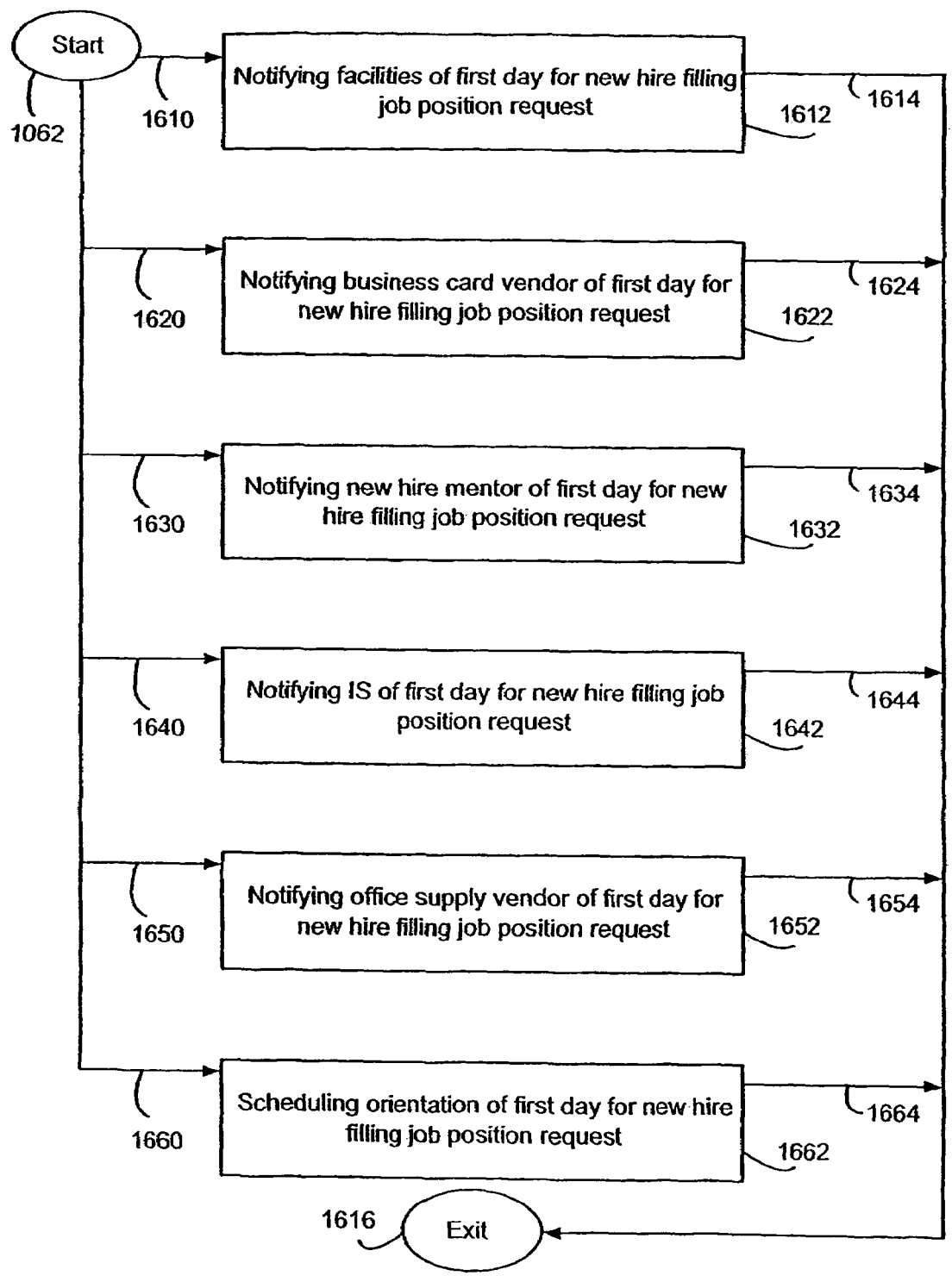
FIG. 8 depicts a detail flowchart of operation 1062 of FIG. 3 further initiating steps for the first day for the new hire.

FIG. 8 depicts a detail flowchart of operation 1062 of FIG. 3 further initiating steps for the first day for the new hire.

Arrow 1610 directs the flow of execution from starting operation 1062 to operation 1612. Operation 1612 performs notifying facilities of the first day for the new hire filling the job position request. Arrow 1614 directs execution from operation 1612 to operation 1616. Operation 1616 terminates the operations of this flowchart.

Arrow 1620 directs the flow of execution from starting operation 1062 to operation 1622. Operation 1622 performs notifying a business card vendor of the first day for the new hire filling the job position request. Arrow 1624 directs execution from operation 1622 to operation 1616. Operation 1616 terminates the operations of this flowchart.

Arrow 1630 directs the flow of execution from starting operation 1062 to operation 1632. Operation 1632 performs notifying a new hire mentor of the first day for the new hire filling the job position request. Arrow 1634 directs execution from operation 1632 to operation 1616. Operation 1616 terminates the operations of this flowchart.

Arrow 1640 directs the flow of execution from starting operation 1062 to operation 1642. Operation 1642 performs notifying IS of the first day for the new hire filling the job position request. Arrow 1644 directs execution from operation 1642 to operation 1616. Operation 1616 terminates the operations of this flowchart.

Arrow 1650 directs the flow of execution from starting operation 1062 to operation 1652. Operation 1652 performs notifying office supply vendor of the first day for the new hire filling the job position request. Arrow 1654 directs execution from operation 1652 to operation 1616. Operation 1616 terminates the operations of this flowchart.

Arrow 1660 directs the flow of execution from starting operation 1062 to operation 1662. Operation 1662 performs scheduling orientation of the first day for the new hire filling the job position request. Arrow 1664 directs execution from operation 1662 to operation 1616. Operation 1616 terminates the operations of this flowchart.

Figure 9:
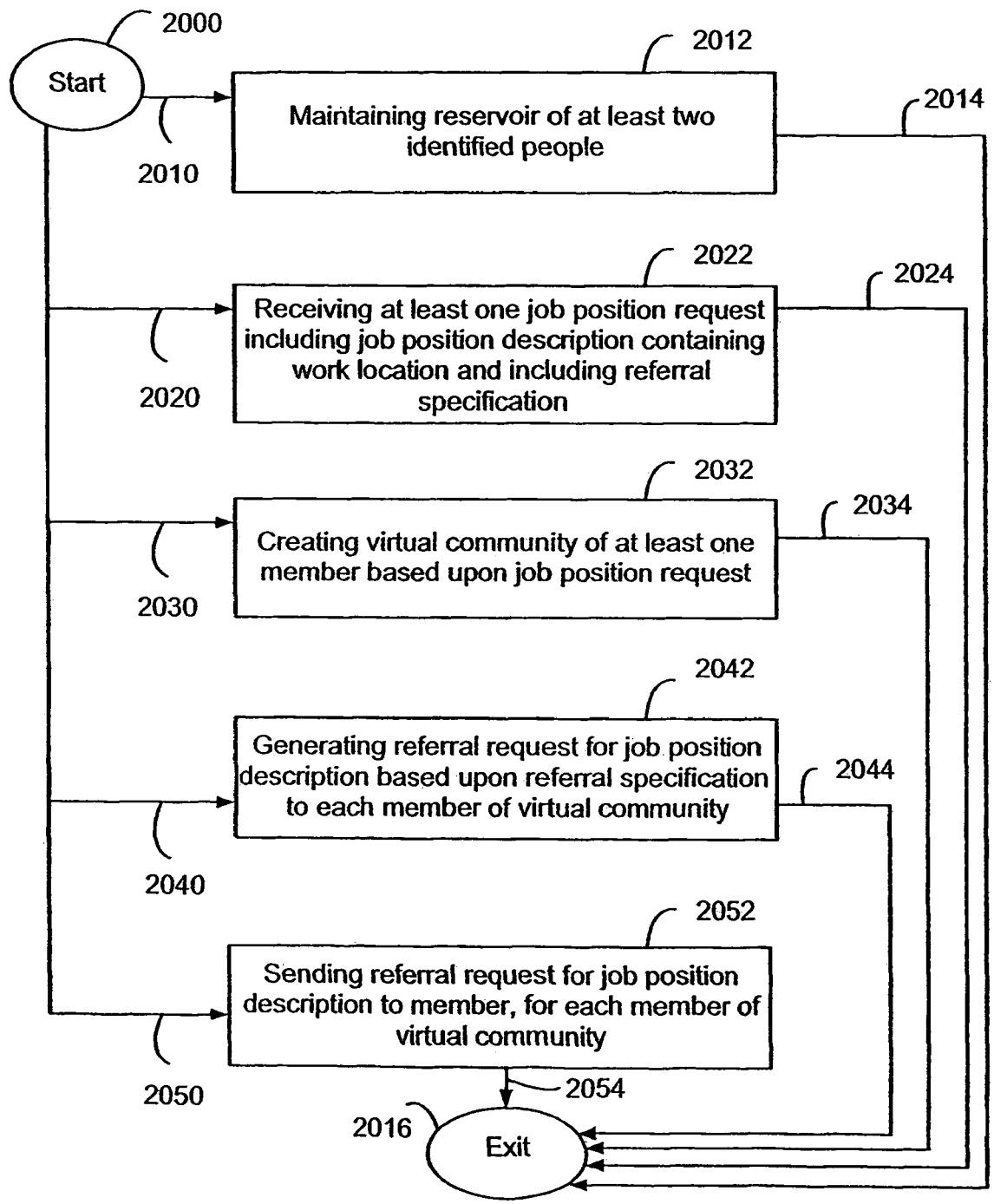
FIG. 9 depicts a detail flowchart of program system 2000 of FIG. 2 implementing a method generating referrals for at least one job positions based upon at least one virtual community comprised of at least one member of the virtual community relevant to the job positions.

FIG. 9 depicts a detail flowchart of program system 2000 of FIG. 2 implementing a method generating referrals for at least one job positions based upon at least one virtual community comprised of at least one member of the virtual community relevant to the job positions.

Arrow 2010 directs the flow of execution from starting operation 2000 to operation 2012. Operation 2012 performs maintaining a reservoir of at least two identified people. Arrow 2014 directs execution from operation 2012 to operation 2016. Operation 2016 terminates the operations of this flowchart.

Note that each of the identified people is attributed a name, a virtual address, a background description, a geographic locale, and a history.

Arrow 2020 directs the flow of execution from starting operation 2000 to operation 2022. Operation 2022 performs receiving at least one job position request including a job position description containing a work location and including a referral specification. Arrow 2024 directs execution from operation 2022 to operation 2016. Operation 2016 terminates the operations of this flowchart.

Arrow 2030 directs the flow of execution from starting operation 2000 to operation 2032. Operation 2032 performs creating a virtual community of at least one member based upon the job position request. Arrow 2034 directs execution from operation 2032 to operation 2016. Operation 2016 terminates the operations of this flowchart.

Arrow 2040 directs the flow of execution from starting operation 2000 to operation 2042. Operation 2042 performs generating a referral request for the job position description based upon the referral specification to each of the members of the virtual community. Arrow 2044 directs execution from operation 2042 to operation 2016. Operation 2016 terminates the operations of this flowchart.

Arrow 2050 directs the flow of execution from starting operation 2000 to operation 2052. Operation 2052 performs sending the referral request for the job position description to the member, for each of the members of the virtual community. Arrow 2054 directs execution from operation 2052 to operation 2016. Operation 2016 terminates the operations of this flowchart.

Figure 10A:
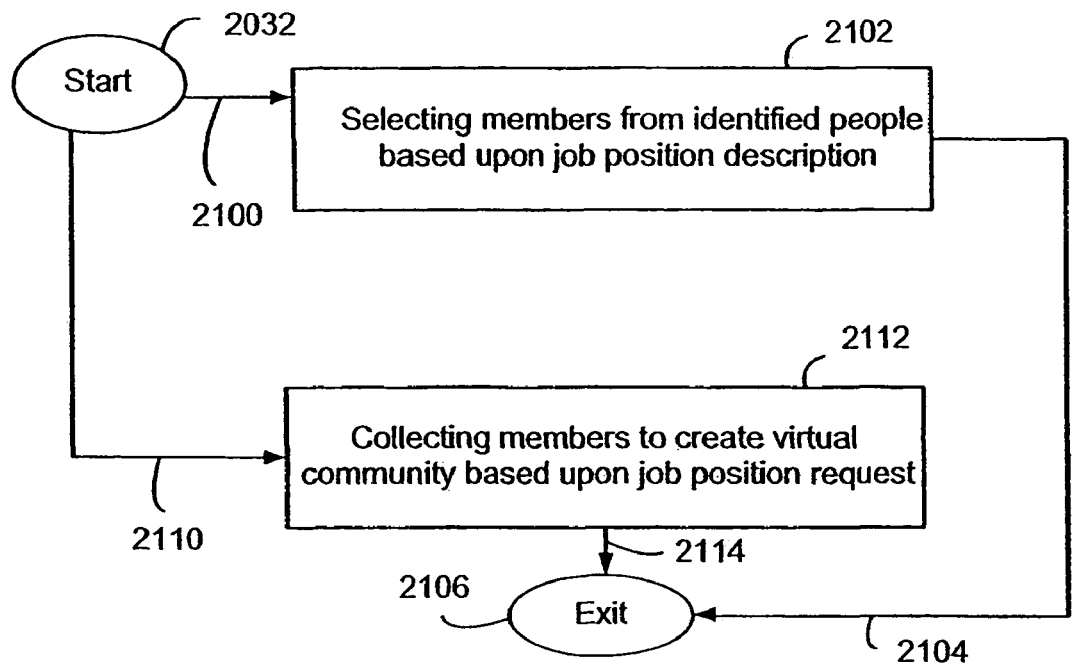
FIG. 10A depicts a detail flowchart of operation 2032 of FIG. 9 further creating the virtual community of at least one member based upon the job position request.

FIG. 10A depicts a detail flowchart of operation 2032 of FIG. 9 further creating the virtual community of at least one member based upon the job position request.

Arrow 2100 directs the flow of execution from starting operation 2032 to operation 2102. Operation 2102 performs selecting the members from the identified people based upon the job position description. Arrow 2104 directs execution from operation 2102 to operation 2106. Operation 2106 terminates the operations of this flowchart.

Arrow 2110 directs the flow of execution from starting operation 2032 to operation 2112. Operation 2112 performs collecting the members to create the virtual community based upon the job position request. Arrow 2114 directs execution from operation 2112 to operation 2106. Operation 2106 terminates the operations of this flowchart.

Figure 10B:
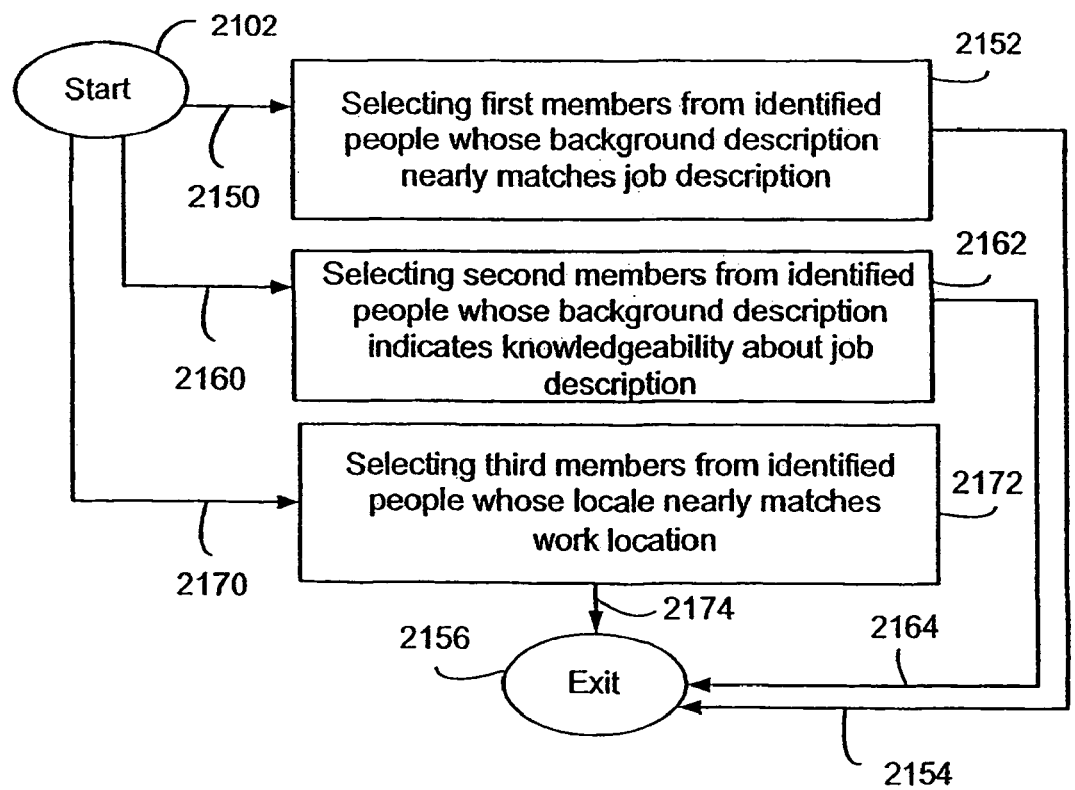
FIG. 10B depicts a detail flowchart of operation 2102 of FIG. 10A further selecting the members from the identified people.

FIG. 10B depicts a detail flowchart of operation 2102 of FIG. 10A further selecting the members from the identified people.

Arrow 2150 directs the flow of execution from starting operation 2102 to operation 2152. Operation 2152 performs selecting a first of the members from the identified people whose the background description nearly matches the job description. Arrow 2154 directs execution from operation 2152 to operation 2156. Operation 2156 terminates the operations of this flowchart.

Arrow 2160 directs the flow of execution from starting operation 2102 to operation 2162. Operation 2162 performs selecting a second of the members from the identified people whose the background description indicates knowledgeability about the job description. Arrow 2164 directs execution from operation 2162 to operation 2156. Operation 2156 terminates the operations of this flowchart.

Arrow 2170 directs the flow of execution from starting operation 2102 to operation 2172. Operation 2172 performs selecting a third of the members from the identified people whose locale nearly matches the work location.

Arrow 2174 directs execution from operation 2172 to operation 2156. Operation 2156 terminates the operations of this flowchart.

Figure 11A:
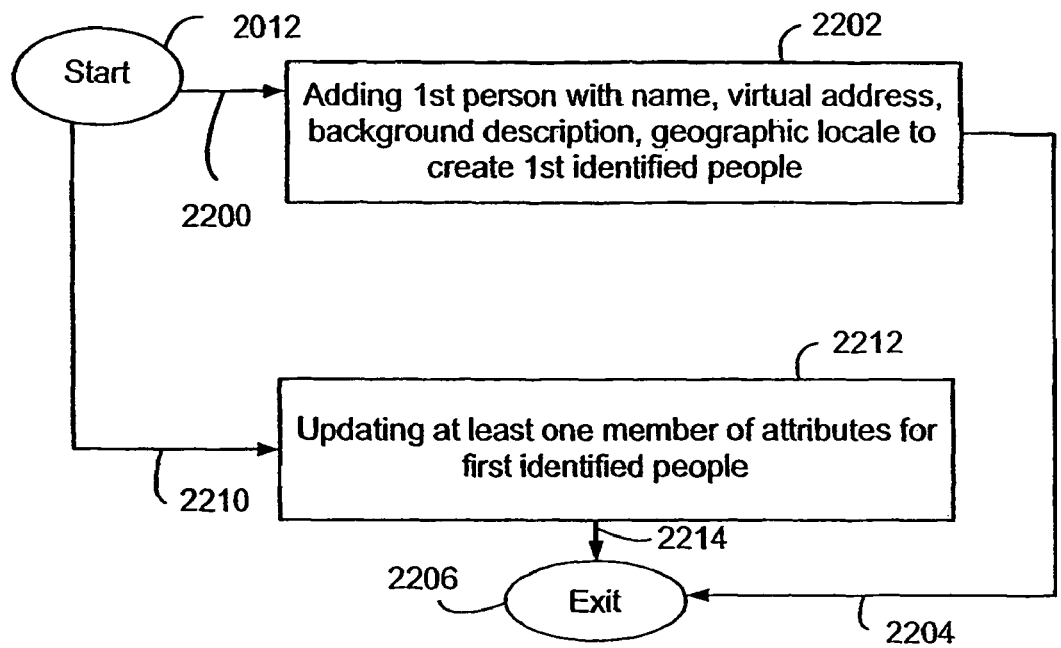
FIG. 11A depicts a detail flowchart of operation 2012 of FIG. 9 further maintaining the reservoir of at least two of the identified people.

FIG. 11A depicts a detail flowchart of operation 2012 of FIG. 9 further maintaining the reservoir of at least two of the identified people.

Arrow 2200 directs the flow of execution from starting operation 2012 to operation 2202. Operation 2202 performs adding a first person with a name, a virtual address, a background description, a geographic locale to create a first of the identified people attributed the name, the virtual address, the background description, the geographical locale with an initial history. Arrow 2204 directs execution from operation 2202 to operation 2206. Operation 2206 terminates the operations of this flowchart.

Arrow 2210 directs the flow of execution from starting operation 2012 to operation 2212. Operation 2212 performs updating at least one member of the attributes for the first of the identified people. Arrow 2214 directs Is execution from operation 2212 to operation 2206. Operation 2206 terminates the operations of this flowchart.

Figure 11B:
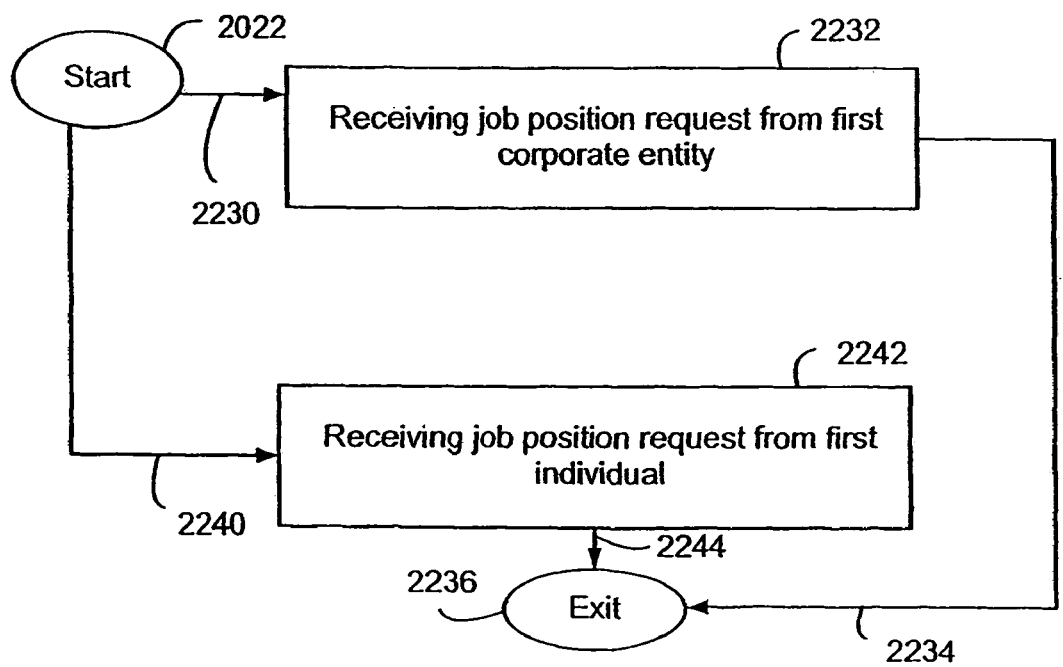
FIG. 11B depicts a detail flowchart of operation 2022 of FIG. 9 further receiving at least one job position request.

FIG. 11B depicts a detail flowchart of operation 2022 of FIG. 9 further receiving at least one job position request.

Arrow 2230 directs the flow of execution from starting operation 2022 to operation 2232. Operation 2232 performs receiving the job position request from a first corporate entity. Arrow 2234 directs execution from operation 2232 to operation 2236. Operation 2236 terminates the operations of this flowchart.

Arrow 2240 directs the flow of execution from starting operation 2022 to operation 2242. Operation 2242 performs receiving the job position request from a first individual. Arrow 2244 directs execution from operation 2242 to operation 2236. Operation 2236 terminates the operations of this flowchart.

Figure 12A:
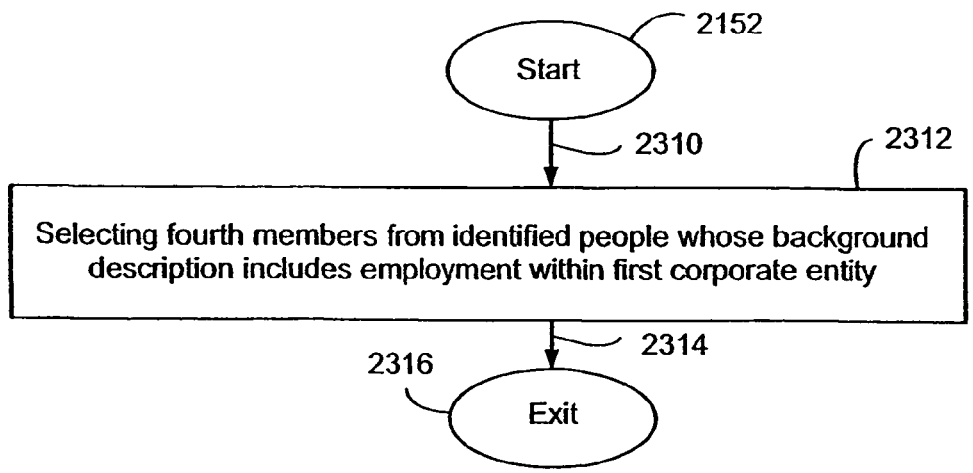
FIG. 12A depicts a detail flowchart of operation 2152 of FIG. 10A further selecting the members from the identified people.

FIG. 12A depicts a detail flowchart of operation 2152 of FIG. 10A further selecting the members from the identified people.

Arrow 2310 directs the flow of execution from starting operation 2152 to operation 2312. Operation 2312 performs selecting a fourth of the members from the identified people whose the background description includes employment within the first corporate entity. Arrow 2314 directs execution from operation 2312 to operation 2316. Operation 2316 terminates the operations of this flowchart.

Note that the referral specification may further include a referral award.

Figure 12B:
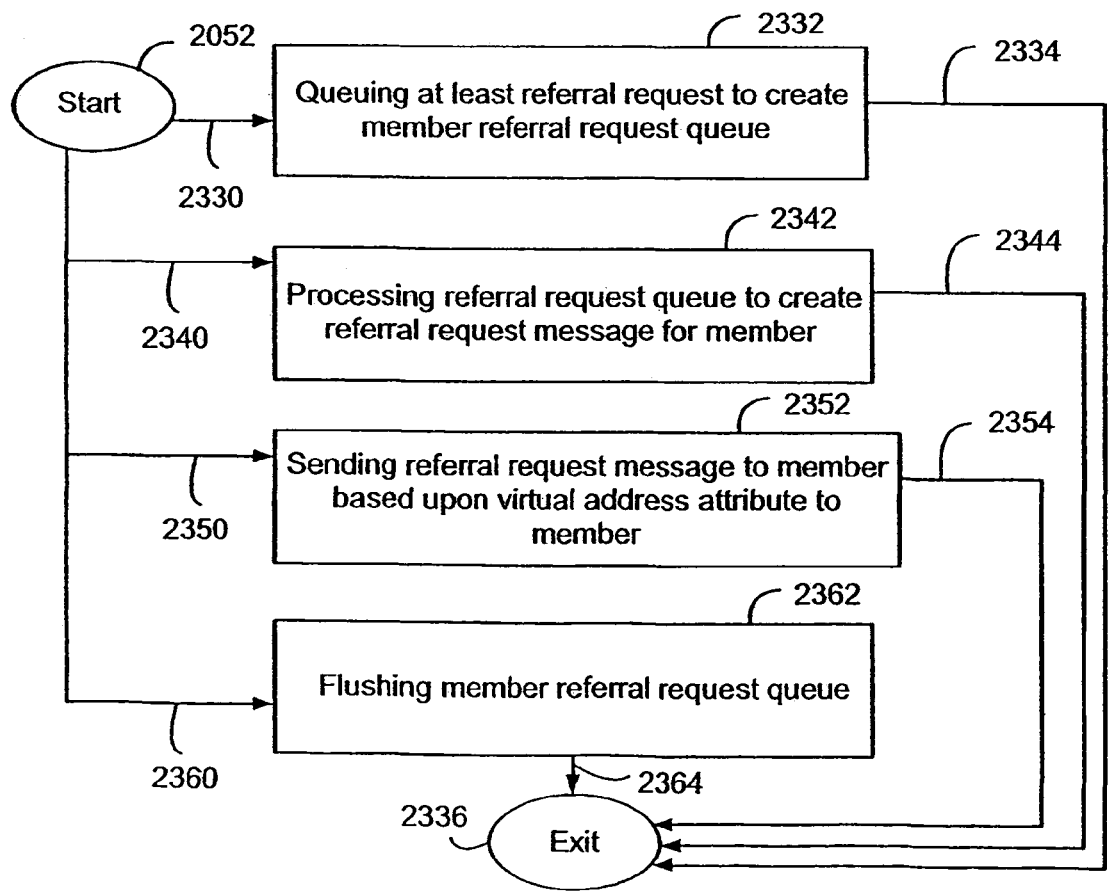
FIG. 12B depicts a detail flowchart of operation 2052 of FIG. 9 further sending the referral request for the job position description to the member, for each of the members of the virtual community.

FIG. 12B depicts a detail flowchart of operation 2052 of FIG. 9 further sending the referral request for the job position description to the member, for each of the members of the virtual community.

Arrow 2330 directs the flow of execution from starting operation 2052 to operation 2332. Operation 2332 performs queuing at least the referral request to create a member referral request queue. Arrow 2334 directs execution from operation 2332 to operation 2336. Operation 2336 terminates the operations of this flowchart.

Arrow 2340 directs the flow of execution from starting operation 2052 to operation 2342. Operation 2342 performs processing the referral request queue to create a referral request message for the member. Arrow 2344 directs execution from operation 2342 to operation 2336. Operation 2336 terminates the operations of this flowchart.

Arrow 2350 directs the flow of execution from starting operation 2052 to operation 2352. Operation 2352 performs sending the referral request message to the member based upon the virtual address attribute to the member. Arrow 2354 directs execution from operation 2352 to operation 2336. Operation 2336 terminates the operations of this flowchart.

Arrow 2360 directs the flow of execution from starting operation 2052 to operation 2362. Operation 2362 performs flushing the member referral request queue. Arrow 2364 directs execution from operation 2362 to operation 2336. Operation 2336 terminates the operations of this flowchart.

Figure 13:
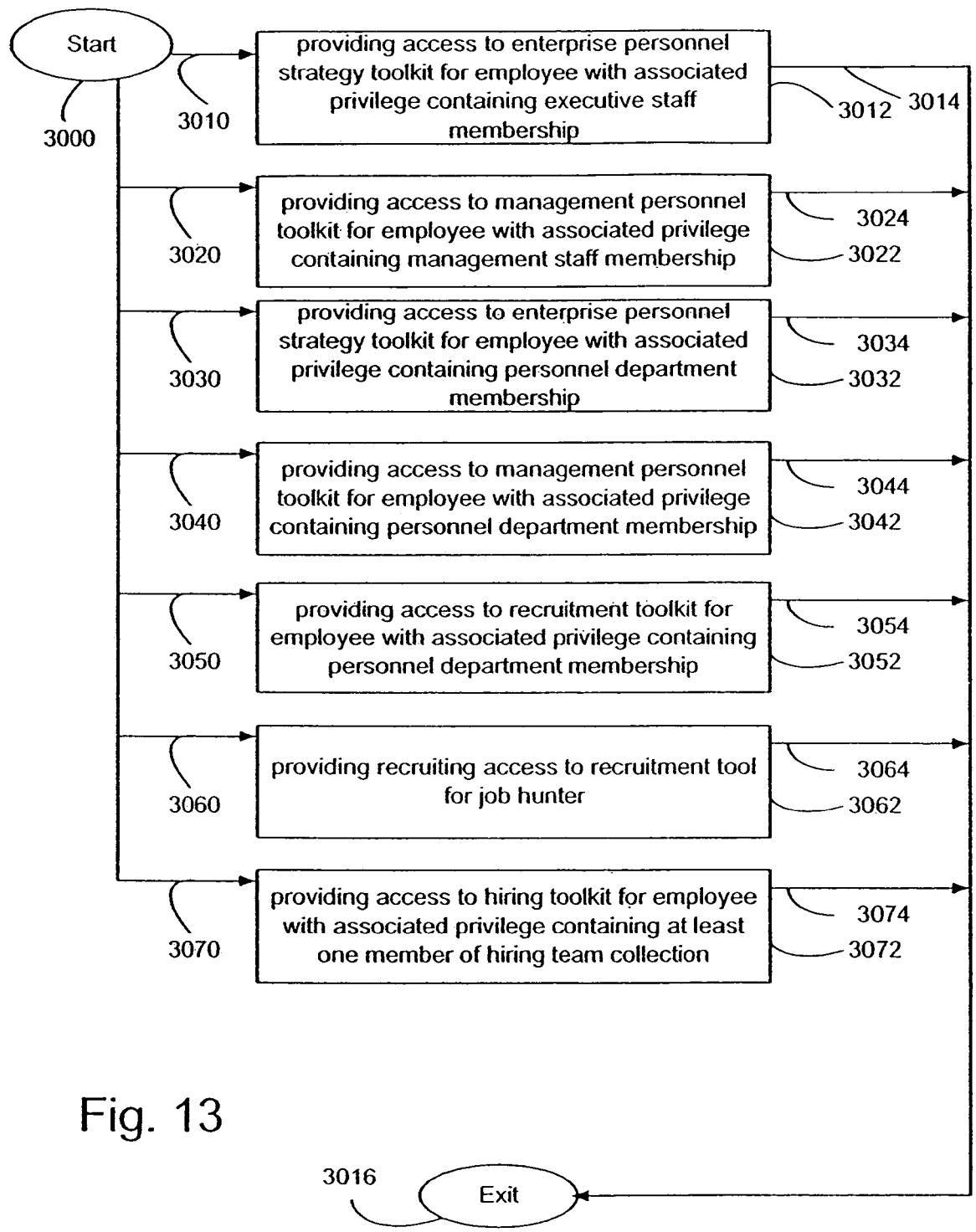
FIG. 13 depicts a detail flowchart of operation 3000 of FIG. 2 implementing a method of operating a personnel workflow tool accessed by at least one employee of a corporate entity and accessed by at least one job hunter.

FIG. 13 depicts a detail flowchart of operation 3000 of FIG. 2 implementing a method of operating a personnel workflow tool accessed by at least one employee of a corporate entity and accessed by at least one job hunter.

Arrow 3010 directs the flow of execution from starting operation 3000 to operation 3012. Operation 3012 performs providing access to an enterprise personnel strategy toolkit for the employee with an associated privilege containing an executive staff membership. Arrow 3014 directs execution from operation 3012 to operation 3016. Operation 3016 terminates the operations of this flowchart.

Arrow 3020 directs the flow of execution from starting operation 3000 to operation 3022. Operation 3022 performs providing access to a management personnel toolkit for the employee with the associated privilege containing a management staff membership. Arrow 3024 directs execution from operation 3022 to operation 3016. Operation 3016 terminates the operations of this flowchart.

Arrow 3030 directs the flow of execution from starting operation 3000 to operation 3032. Operation 3032 performs providing access to the enterprise personnel strategy toolkit for the employee with the associated privilege containing a personnel department membership. Arrow 3034 directs execution from operation 3032 to operation 3016. Operation 3016 terminates the operations of this flowchart.

Arrow 3040 directs the flow of execution from starting operation 3000 to operation 3042. Operation 3042 performs providing access to a management personnel toolkit for the employee with the associated privilege containing the personnel department membership. Arrow 3044 directs execution from operation 3042 to operation 3016. Operation 3016 terminates the operations of this flowchart.

Arrow 3050 directs the flow of execution from starting operation 3000 to operation 3052. Operation 3052 performs providing access to a recruitment toolkit for the employee with the associated privilege containing the personnel department membership. Arrow 3054 directs execution from operation 3052 to operation 3016. Operation 3016 terminates the operations of this flowchart.

Arrow 3060 directs the flow of execution from starting operation 3000 to operation 3062. Operation 3062 performs providing recruiting access to the recruitment tool for the job hunter. Arrow 3064 directs execution from operation 3062 to operation 3016. Operation 3016 terminates the operations of this flowchart.

Arrow 3070 directs the flow of execution from starting operation 3000 to operation 3072. Operation 3072 performs providing access to a hiring toolkit for the employee with the associated privilege containing at least one member of the hiring team collection. Arrow 3074 directs execution from operation 3072 to operation 3016. Operation 3016 terminates the operations of this flowchart.

The hiring team collection may include the personnel department membership is and the management staff membership and an IS staff membership and a facility staff membership.

Figure 14:
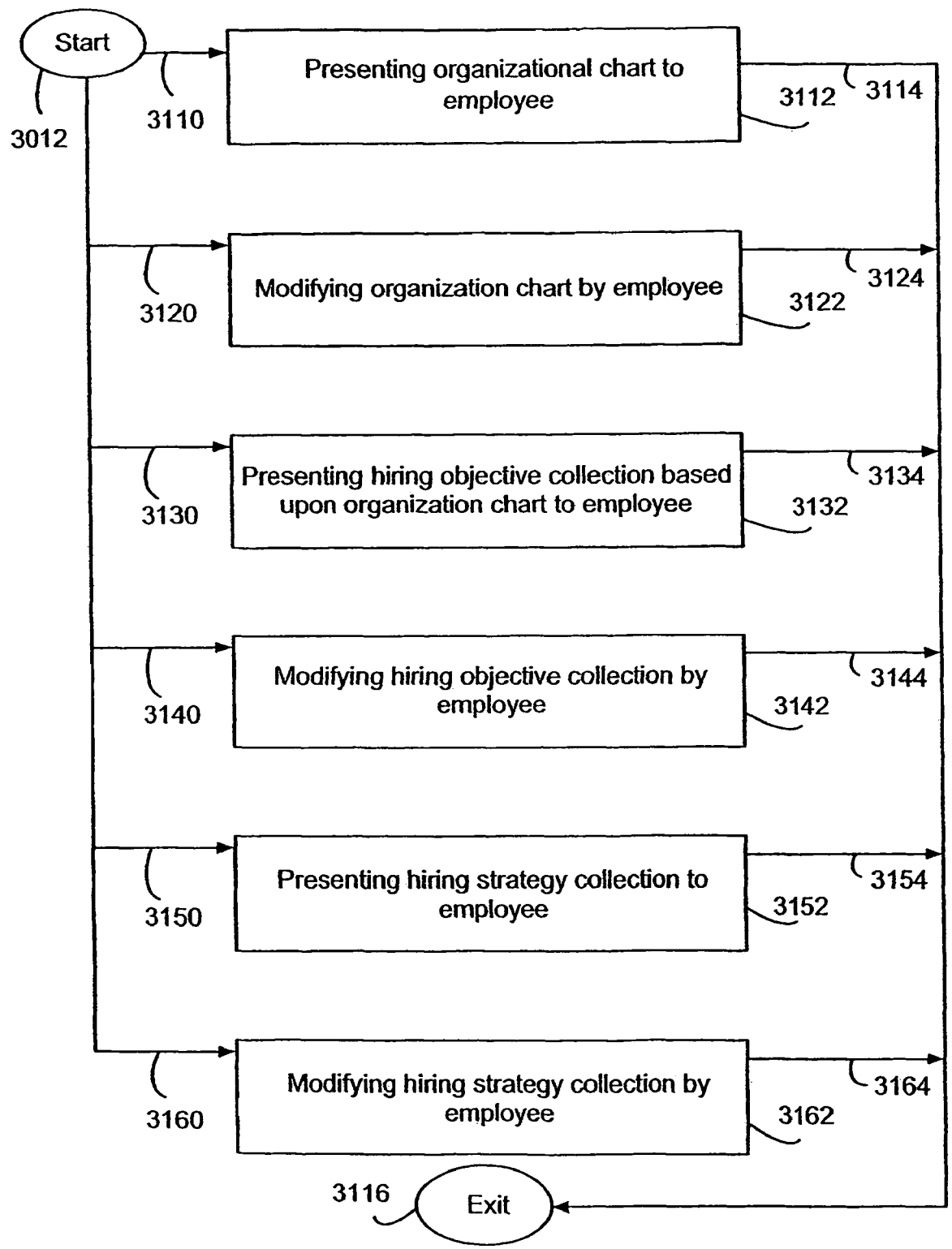
FIG. 14 depicts a detail flowchart of operation 3012 of FIG. 13 further providing access to the enterprise personnel strategy toolkit for the employee with an associated privilege containing an executive staff membership.

FIG. 14 depicts a detail flowchart of operation 3012 of FIG. 13 further providing access to the enterprise personnel strategy toolkit for the employee with an associated privilege containing an executive staff membership.

Arrow 3110 directs the flow of execution from starting operation 3012 to operation 3112. Operation 3112 performs presenting an organizational chart to the employee. Arrow 3114 directs execution from operation 3112 to operation 3116. Operation 3116 terminates the operations of this flowchart.

Arrow 3120 directs the flow of execution from starting operation 3012 to operation 3122. Operation 3122 performs modifying the organization chart by the employee. Arrow 3124 directs execution from operation 3122 to operation 3116. Operation 3116 terminates the operations of this flowchart.

Arrow 3130 directs the flow of execution from starting operation 3012 to operation 3132. Operation 3132 performs presenting a hiring objective collection based upon the organization chart to the employee. Arrow 3134 directs execution from operation 3132 to operation 3116. Operation 3116 terminates the operations of this flowchart.

Note that the hiring objective collection contains at least one hiring objective item.

Arrow 3140 directs the flow of execution from starting operation 3012 to operation 3142. Operation 3142 performs modifying the hiring objective collection by the employee. Arrow 3144 directs execution from operation 3142 to operation 3116. Operation 3116 terminates the operations of this flowchart.

Arrow 3150 directs the flow of execution from starting operation 3012 to operation 3152. Operation 3152 performs presenting a hiring strategy collection to the employee. Arrow 3154 directs execution from operation 3152 to operation 3116. Operation 3116 terminates the operations of this flowchart.

Note that the hiring strategy collection contains at least one hiring strategy item.

Arrow 3160 directs the flow of execution from starting operation 3012 to operation 3162. Operation 3162 performs modifying the hiring strategy collection by the employee. Arrow 3164 directs execution from operation 3162 to operation 3116. Operation 3116 terminates the operations of this flowchart.

Figure 15:
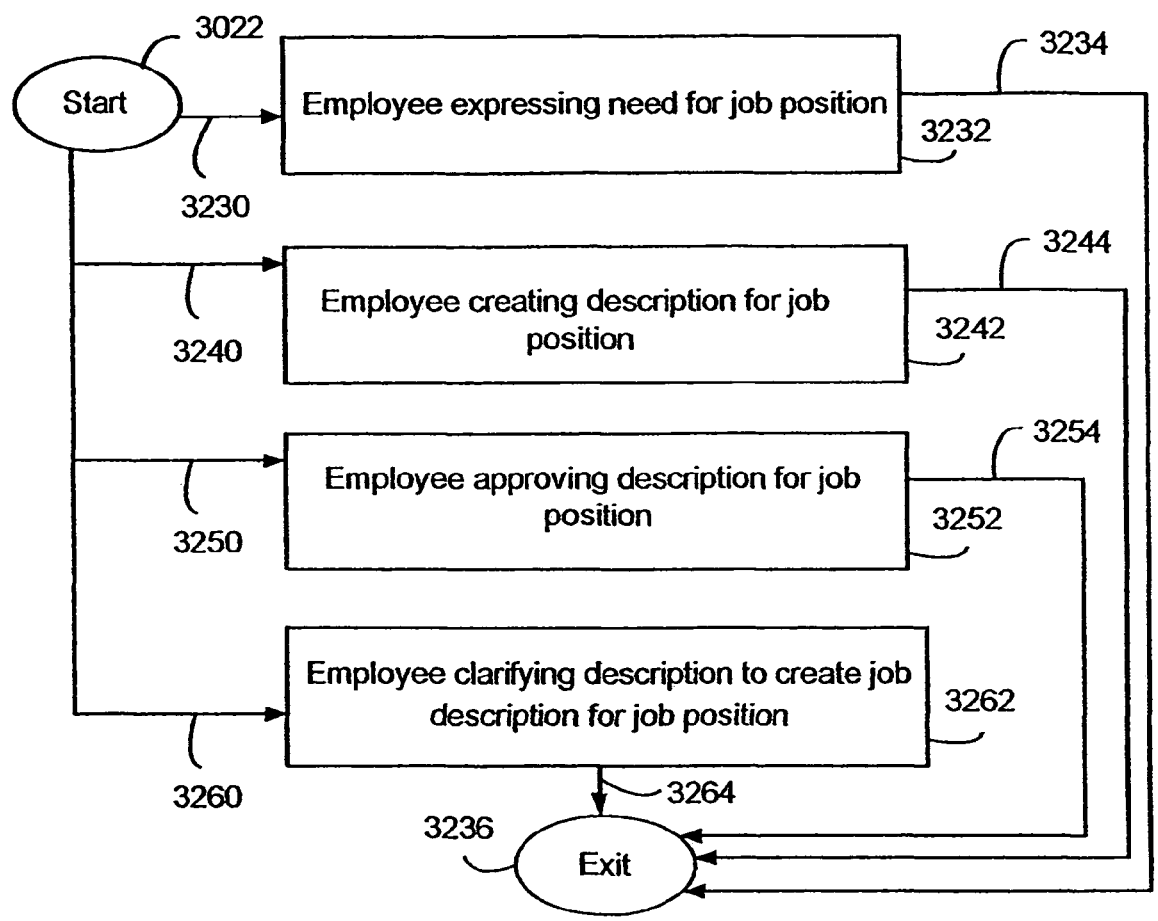
FIG. 15 depicts a detail flowchart of operation 3022 of FIG. 13 further providing access to a management personnel toolkit for the employee with the associated privilege containing a management staff membership.

FIG. 15 depicts a detail flowchart of operation 3022 of FIG. 13 further providing access to a management personnel toolkit for the employee with the associated privilege containing a management staff membership.

Arrow 3230 directs the flow of execution from starting operation 3022 to operation 3232. Operation 3232 performs the employee expressing a need for a job position. Arrow 3234 directs execution from operation 3232 to operation 3236. Operation 3236 terminates the operations of this flowchart.

Arrow 3240 directs the flow of execution from starting operation 3022 to operation 3242. Operation 3242 performs the employee creating a description for the job position. Arrow 3244 directs execution from operation 3242 to operation 3236. Operation 3236 terminates the operations of this flowchart.

Arrow 3250 directs the flow of execution from starting operation 3022 to operation 3252. Operation 3252 performs the employee approving the description for the job position. Arrow 3254 directs execution from operation 3252 to operation 3236. Operation 3236 terminates the operations of this flowchart.

Arrow 3260 directs the flow of execution from starting operation 3022 to operation 3262. Operation 3262 performs the employee clarifying the description to create a job description for the job position. Arrow 3264 directs execution from operation 3262 to operation 3236. Operation 3236 terminates the operations of this flowchart.

The preceding embodiments have been provided by way of example and are not meant to constrain the scope of the following claims.

The invention claimed is:

1. A system generating referrals for at least one job position, comprising:
   a server coupled to a memory;
   said server communicatively accessibly an employee of a corporate entity and a job hunter;
   said server operated by a program residing in said memory and executing the steps of:
   maintaining a reservoir of at least two identified people, wherein each of said identified people is attributed a name, a virtual address, a background description, a geographic locale, and a history;
   receiving at least one job position request including a job position description containing a work location and including a referral specification;

creating a virtual community of at least one member based upon said job position request;

generating a referral request for said job position description based upon said referral specification to each of said members of said virtual community; and sending said referral request for said job position description to said member, for each of said members of said virtual community;

wherein the step of creating said virtual community further comprises the steps of:

selecting said members from said identified people based upon said job position description; and collecting said members to create said virtual community based upon said job position request;

wherein the step of selecting said members from said identified people is further comprised of the step of:

selecting a first of said members from said identified people whose said background description nearly matches said job description;

wherein the step of sending said referral request for said job position description to said member is further comprised of the steps of:

queuing at least said referral request to create a member referral request queue:

processing said referral request queue to create a referral request message for said member;

sending said referral request message to said member based upon said virtual address attribute to said member; and flushing said member referral request queue.

2. The system of claim 1, wherein the step of maintaining said reservoir of at least two of said identified people is further comprised of the steps of:

adding a first person with a name, a virtual address, a background description, a geographic locale to create a first of said identified people attributed said name, said virtual address, said background description, said geographical locale with an initial history; and updating at least one member of said attributes for said first of said identified people.

3. The system of claim 2, wherein the step of selecting said members from said identified people is further comprised of the step of:

selecting a second of said members from said identified people whose said background description includes employment within a first corporate entity.

4. The system of claim 1, wherein the step of receiving at least one job position request is further comprised of the steps of:

receiving said job position request from a first corporate entity; and receiving said job position request from a first individual.

5. The system of claim 1, wherein said referral specification comprises a referral award.

6. A method generating referrals for at least one job position, comprising the steps of:

maintaining a reservoir of at least two identified people, wherein each of said identified people is attributed a name, a virtual address, a background description, a geographic locale, and a history;

receiving at least one job position request including a job position description containing a work location and including a referral specification;

creating a virtual community of at least one member based upon said job position request;

generating a referral request for said job position description based upon said referral specification to each of said members of said virtual community; and sending said referral request for said job position description to said member, for each of said members of said virtual community;

wherein the step of creating said virtual community further comprises the steps of:

selecting said members from said identified people based upon said job position description; and collecting said members to create said virtual community based upon said job position request;

wherein the step of selecting said members from said identified people is further comprised of the step of:

selecting a first of said members from said identified people whose said background description nearly matches said job description wherein the step of sending said referral request for said job position description to said member, for each of said members of said virtual community, is further comprised of the steps of:

queuing at least said referral request to create a member referral request queue;

processing said referral request queue to create a referral request message for said member;

sending said referral request message to said member based upon said virtual address attribute to said member; and flushing said member referral request queue.

7. The method of claim 6, wherein the step of maintaining said reservoir of at least two of said identified people is further comprised of the steps of:

adding a first person with a name, a virtual address, a background description, a geographic locale to create a first of said identified people attributed said name, said virtual address, said background description, said geographical locale with an initial history; and updating at least one member of said attributes for said first of said identified people.

8. The method of claim 7, wherein the step of selecting said members from said identified people is further comprised of the step of:

selecting a second of said members from said identified people whose said background description includes employment within a first corporate entity.

9. The method of claim 6, wherein the step of receiving at least one job position request is further comprised of the steps of:

receiving said job position request from a first corporate entity; and receiving said job position request from a first individual.

10. The method of claim 6, wherein said referral specification comprises a referral award.

11. A system generating referrals for at least one job position, comprising:

a server coupled to a memory;

said server communicatively accessibly an employee of a corporate entity and a job hunter;

said server operated by a program residing in said memory and executing the steps of:

maintaining a reservoir of at least two identified people, wherein each of said identified people is attributed a name, a virtual address, a background description, a geographic locale, and a history;

receiving at least one job position request including a job position description containing a work location and including a referral specification;
creating a virtual community of at least one member based upon said job position request;
generating a referral request for said job position description based upon said referral specification to each of said members of said virtual community; and
sending said referral request for said job position description to said member, for each of said members of said virtual community;
wherein the step of creating said virtual community further comprises the steps of:
selecting said members from said identified people based upon said job position description; and
collecting said members to create said virtual community based upon said job position request;
wherein the step of selecting said members from said identified people is further comprised of the step of:
selecting a first of said members from said identified people whose said background description indicates knowledgeability about said job description;
wherein the step of sending said referral request for said job position description to said member is further comprised of the steps of:
queuing at least said referral request to create a member referral request queue;
processing said referral request queue to create a referral request message for said member;
sending said referral request message to said member based upon said virtual address attribute to said member; and
flushing said member referral request queue.

12. The system of claim 11,
wherein the step of maintaining said reservoir of at least two of said identified people is further comprised of the steps of:
adding a first person with a name, a virtual address, a background description, a geographic locale to create a first of said identified people attributed said name, said virtual address, said background description, said geographical locale with an initial history; and
updating at least one member of said attributes for said first of said identified people.

13. The system of claim 11,
wherein the step of receiving at least one job position request is further comprised of the steps of:
receiving said job position request from a first corporate entity; and
receiving said job position request from a first individual.

14. The system of claim 11,
wherein the step of selecting said members from said identified people is further comprised of the step of:
selecting a second of said members from said identified people whose said background description includes employment within a first corporate entity.

15. The system of claim 11,
wherein said referral specification comprises a referral award.

16. A method generating referrals for at least one job position, comprising the steps of:
maintaining a reservoir of at least two identified people, wherein each of said identified people is attributed a name, a virtual address, a background description, a geographic locale, and a history;

receiving at least one job position request including a job position description containing a work location and including a referral specification;
creating a virtual community of at least one member based upon said job position request;
generating a referral request for said job position description based upon said referral specification to each of said members of said virtual community; and
sending said referral request for said job position description to said member, for each of said members of said virtual community;
wherein the step of creating said virtual community further comprises the steps of:
selecting said members from said identified people based upon said job position description; and
collecting said members to create said virtual community based upon said job position request;
wherein the step of selecting said members from said identified people is further comprised of the step of:
selecting a first of said members from said identified people whose said background description indicates knowledgeability about said job description;
wherein the step of sending said referral request for said job position description to said member, for each of said members of said virtual community, is further comprised of the steps of:
queuing at least said referral request to create a member referral request queue;
processing said referral request queue to create a referral request message for said member;
sending said referral request message to said member based upon said virtual address attribute to said member; and
flushing said member referral request queue.

17. The method of claim 16,
wherein the step of maintaining said reservoir of at least two of said identified people is further comprised of the steps of:
adding a first person with a name, a virtual address, a background description, a geographic locale to create a first of said identified people attributed said name, said virtual address, said background description, said geographical locale with an initial history; and
updating at least one member of said attributes for said first of said identified people.

18. The method of claim 16,
wherein the step of receiving at least one job position request is further comprised of the steps of:
receiving said job position request from a first corporate entity; and
receiving said job position request from a first individual.

19. The method of claim 16,
wherein the step of selecting said members from said identified people is further comprised of the step of:
selecting a second of said members from said identified people whose said background description includes employment within a first corporate entity.

20. The method of claim 16,
wherein said referral specification comprises a referral award.

21. A system generating referrals for at least one job position, comprising:
a server coupled to a memory;
said server communicatively accessibly an employee of a corporate entity and a job hunter;
said server operated by a program residing in said memory and executing the steps of:

maintaining a reservoir of at least two identified people, wherein each of said identified people is attributed a name, a virtual address, a background description, a geographic locale, and a history;

receiving at least one job position request including a job position description containing a work location and including a referral specification;

creating a virtual community of at least one member based upon said job position request;

generating a referral request for said job position description based upon said referral specification to each of said members of said virtual community; and sending said referral request for said job position description to said member, for each of said members of said virtual community;

wherein the step of creating said virtual community further comprises the steps of:
  selecting said members from said identified people based upon said job position description; and
  collecting said members to create said virtual community based upon said job position request;

wherein the step of selecting said members from said identified people is further comprised of the step of:
selecting a first of said members from said identified people whose locale nearly matches said work location;

wherein the step of sending said referral request for said job position description to said member is further comprised of the steps of:
queuing at least said referral request to create a member referral request queue;
processing said referral request queue to create a referral request message for said member;
sending said referral request message to said member based upon said virtual address attribute to said member; and
flushing said member referral request queue.

22. The system of claim 21, wherein the step of maintaining said reservoir of at least two of said identified people is further comprised of the steps of:
  adding a first person with a name, a virtual address, a background description, a geographic locale to create a first of said identified people attributed said name, said virtual address, said background description, said geographical locale with an initial history; and
  updating at least one member of said attributes for said first of said identified people.

23. The system of claim 21,
wherein the step of receiving at least one job position request is further comprised of the steps of:
receiving said job position request from a first corporate entity; and
receiving said job position request from a first individual.

24. The system of claim 21,
wherein the step of selecting said members from said identified people is further comprised of the step of:
selecting a second of said members from said identified people whose said background description includes employment within a first corporate entity.

25. The system of claim 21,
wherein said referral specification comprises a referral award.

26. A system generating referrals for at least one job position, comprising:
a server coupled to a memory;
said server communicatively accessibly an employee of a corporate entity and a job hunter;
said server operated by a program residing in said memory and executing the steps of:
maintaining a reservoir of at least two identified people, wherein each of said identified people is attributed a name, a virtual address, a background description, a geographic locale, and a history;

receiving at least one job position request including a job position description containing a work location and including a referral specification;

creating a virtual community of at least one member based upon said job position request;

generating a referral request for said job position description based upon said referral specification to each of said members of said virtual community; and sending said referral request for said job position description to said member, for each of said members of said virtual community;

wherein the step of creating said virtual community further comprises the steps of:
  selecting said members from said identified people based upon said job position description; and
  collecting said members to create said virtual community based upon said job position request;

wherein the step of selecting said members from said identified people is further comprised of the step of:
selecting a first of said members from said identified people whose locale nearly matches said work locations;

wherein the step of sending said referral request for said job position description to said member, for each of said members of said virtual community, is further comprised of the steps of:
queuing at least said referral request to create a member referral request queue:
processing said referral request queue to create a referral request message for said member;
sending said referral request message to said member based upon said virtual address attribute to said member; and
flushing said member referral request queue.

27. The method of claim 26, wherein the step of maintaining said reservoir of at least two of said identified people is further comprised of the steps, of:
  adding a first person with a name, a virtual address, a background description, a geographic locale to create a first of said identified people attributed said name, said virtual address, said background description, said geographical locale with an initial history; and
  updating at least one member of said attributes for said first of said identified people.

28. The method of claim 26, wherein the step of receiving at least one job position request is further comprised of the steps of:
receiving said job position request from a first corporate entity; and
receiving said job position request from a first individual.

29. The method of claim 26,
wherein the step of selecting said members from said identified people is further comprised of the step of:
selecting a second of said members from said identified people whose said background description includes employment within a first corporate entity.

30. The method of claim 26,
wherein said referral specification comprises a referral award.

* * * * *

UNITED STATES PATENT AND TRADEMARK OFFICE
CERTIFICATE OF CORRECTION

PATENT NO. : 7,346,535 B2 Page 1 of 1
APPLICATION NO. : 11/385490
DATED : March 18, 2008
INVENTOR(S) : John Younger It is certified that error appears in the above-identified patent and that said Letters Patent is hereby corrected as shown below:

On the Title Page, Item (60) should read,
    It should be listed as related U.S. International Patent Application, as indicated below:

"PCT/US01/12849, filed on April 19, 2001"

Signed and Sealed this

Twenty-fourth Day of June, 2008

JON W. DUDAS
*Director of the United States Patent and Trademark Office*